(12) United States Patent
Brunelle

(10) Patent No.: US 9,046,896 B1
(45) Date of Patent: Jun. 2, 2015

(54) STEAM HEATING SYSTEM METHOD AND APPARATUS TO ACCURATELY CONTROL TEMPERATURE WITHIN A BUILDING THROUGH THE ELECTROMECHANICAL CONTROL OF RADIATOR AIR VENTING

(71) Applicant: Theodore Melyan Brunelle, New Milford, PA (US)

(72) Inventor: Theodore Melyan Brunelle, New Milford, PA (US)

(*) Notice: Subject to any disclaimer, the term of this patent is extended or adjusted under 35 U.S.C. 154(b) by 215 days.

(21) Appl. No.: 13/861,232

(22) Filed: Apr. 11, 2013

(51) Int. Cl.
G05D 23/19 (2006.01)

(52) U.S. Cl.
CPC ............ *G05D 23/19* (2013.01); *G05D 23/1934* (2013.01)

(58) Field of Classification Search
CPC ..... G04F 1/32; G04F 1/3203; G05D 23/1927; G05D 23/1928; G05D 23/193; G05D 23/1931; G05D 23/1932; G05D 23/1934
USPC .......... 700/276, 277, 278, 299, 300; 165/253, 165/254; 236/1 B, 1 C, 37; 454/239
See application file for complete search history.

(56) References Cited

U.S. PATENT DOCUMENTS

| | | | |
|---|---|---|---|
| 2,494,293 A * | 1/1950 | Gorton | 236/62 |
| 6,053,416 A * | 4/2000 | Specht et al. | 236/75 |
| 7,957,839 B2 * | 6/2011 | Takach et al. | 700/276 |
| 8,172,153 B1 * | 5/2012 | Kennedy et al. | 236/1 B |
| 2013/0245838 A1 * | 9/2013 | Zywicki et al. | 700/278 |

* cited by examiner

Primary Examiner — William Gilbert

(57) ABSTRACT

A method of controlling a steam heating system on a zone by zone, and radiator by radiator basis, through the electromechanically controlled release of air from radiators. A programmable set of target temperatures for each zone is stored in a microprocessor module. The microprocessor monitors the air temperature of each zone through probes. The microprocessor can selectively open and close the electromechanical air vent valves installed on each radiator's vent port. When one of the vent valves is caused to be opened, the steam boiler is triggered to start producing steam pressure; steam displaces the air in the radiators, out the vent valves, heating them up. Each zone's temperature is achieved and maintained by controlling the associated radiators' output through modulating their air vent valves. Through the microprocessor's adjustment of the vent valves' temperatures and cycle timing, optimal energy efficiency across multiple zone control is achieved.

13 Claims, 30 Drawing Sheets

| zone_currently_on[n] | |
|---|---|
| 1 | FALSE |
| 2 | FALSE |
| 3 | TRUE |

Fig 8A

| zone_temp[n] | |
|---|---|
| 1 | 71.05 |
| 2 | 68.79 |
| 3 | 72.50 |

Fig 8B

| zone_delta_temp[n] | |
|---|---|
| 1 | 2.0 |
| 2 | 2.0 |
| 3 | 1.5 |

Fig 8C

| radiator_delay_seconds[n] | |
|---|---|
| 1 | 0.00 |
| 2 | 0.00 |
| 3 | 10.00 |
| 4 | 0.00 |

Fig 8D

| zone_time_start[n] | |
|---|---|
| 1 | 1364994910 |
| 2 | 1364995422 |
| 3 | 1364995963 |

Fig 8E

| rad_in_zone[n] | | |
|---|---|---|
| idx | radiator_num | zone_num |
| 1 | 1 | 1 |
| 2 | 2 | 2 |
| 3 | 3 | 2 |
| 4 | 4 | 3 |

Fig 8F

| radiator_on[n] | |
|---|---|
| 1 | false |
| 2 | false |
| 2 | false |
| 4 | true |

Fig 8G

| zone_avg_time_to_temp[n] | |
|---|---|
| 1 | 1805 seconds |
| 2 | 2100 seconds |
| 3 | 60 seconds |

Fig 8H

| temp_sensor[n] | | |
|---|---|---|
| idx | sensor_value | zone_num |
| 1 | 71.05 | 1 |
| 2 | 69.50 | 2 |
| 3 | 72.50 | 3 |

Fig 8I

| radiator_temp[n] | |
|---|---|
| 1 | 134.2 |
| 2 | 140.8 |
| 3 | 110.2 |
| 4 | 77.0 |

Fig 8J

| INPUTS / OUTPUTS: | |
|---|---|
| NAME | DESCRIPTION |
| radiator_temp_sensor_value[i] | live temperature sensor reading from serial bus |
| radiator_solenoid(n, (high/low)) | Open / Close air solenoid n |
| temp_sensor_value[n] | live temperature sensor reading from serial bus |

Fig 8K

STEAM HEATING SYSTEM METHOD AND APPARATUS TO ACCURATELY CONTROL TEMPERATURE WITHIN A BUILDING THROUGH THE ELECTROMECHANICAL CONTROL OF RADIATOR AIR VENTING

CROSS-REFERENCE TO RELATED APPLICATIONS

Not Applicable

FEDERALLY SPONSORED RESEARCH

Not Applicable

BACKGROUND

1. Field

This application relates to heating systems, specifically heating systems that work through the use of steam.

2. Prior Art

Steam heating systems are one of the common types of central heating systems used in residential, commercial, and industrial buildings. The operating principle involves heating water in a boiler to produce steam pressure. The steam rises through a network of pipes, and into hollow metal radiators. In order to allow the steam to fill the radiators, the air in the system must be displaced to make room for the incoming steam. Each radiator thus has an air vent, usually located on the opposite side of the radiator from which a steam supply pipe enters, that allows the air to be pushed out of the piping and radiator by the steam. Each air vent has a fixed size restrictive hole through which the air escapes, used to regulates the rate at which the air is allowed to be displaced, and therefore the rate at which the steam fills the radiator.

The radiators provide a great degree of surface area that helps the heat from the steam transfer to the radiator's metal. The heated radiator metal then transfers its heat to the ambient air in the various rooms of the building where they are located. As the energy from the steam is given up in the form of heat, it begins to condense back into water. The condensate water is directed back into the boiler from which it came, through either returning down the pipes from which it originated that are pitched back toward the boiler, or through a system of condensate pipes that separate the condensate water from the new, hot steam that is coming from the boiler.

The even distribution of heat throughout a building is controlled by the rate at which air is allowed to be displaced out of each radiator. This is accomplished through the use of air vents, such as the one described in U.S. Pat. No. 2,494,293 to Gorton, 1950 Jan. 10. Each vent bears a differing sized air escape orifice identified by a system of letters and numbers. The sizing of each radiator's air vent is based on a number of criteria, such as their proximity to the room containing the thermostat, the floor the radiator is located on, and how much piping is between each radiator and the boiler. The theory is that an appropriately sized air vent is chosen so that the steam will arrive at and heat each radiator at about the same time. After much of the air has been expelled from the piping and radiator(s) and the radiator(s) begin to heat up, the air vent is caused to close by any number of factors, depending on the vent's design, such as temperature and/or moisture/condensate build-up. Once an air vent valve closes, no more steam can enter into that radiator, and it ceases to rise in temperature.

The steam, trapped in each radiator, begins to lose its temperature as its heat is transferred to the metal of the radiator, and, in turn, to the surrounding air in which the radiator is located. The steam cools, condenses back into water, and returns back to the boiler through the piping. For a reversal of the same reasons that acted upon the air vent to make it close, the valve opens. This allows for more steam from the boiler and piping to push out any new air that has entered the system, and new, hot incoming steam to fill the radiators again.

This process continues until the room where the thermostat is located has increased in temperature sufficiently to open the thermostat's internal limit switch, breaking the boiler's circuit, causing the boiler to turn off. When the temperature again drops below the thermostat's set temperature, the thermostat's internal switch again closes, turning the boiler back on, repeating the process.

Disadvantages of the Prior Art

There are several problems with this system that cause it to be less than adequate.

(a) There is no way to zone rooms or areas of a building; there will always be some rooms that are either hotter or colder than desired due to uneven temperature regulation. Since central heating systems are used to heat multiple rooms in a building, and the sole method of temperature regulation in a system is a single thermostat, all rooms but the room with the thermostat will be heated arbitrarily without regard to their actual ambient temperature. This leads to rooms that are regularly either hotter, or colder than desired, resulting in, among other things, a potentially uncomfortable environment to occupy or wasted heat energy.

(b) The net heat output of each radiator is based solely on the physical size of each radiator, and the time it takes for steam to travel through the radiator and piping, until the steam activates the air vent. All radiators' individual peak temperatures are usually fixed, peaking at a temperature well below the actual temperature of the incoming steam. This is because the vent valve is usually thermally activated, and closes at a fixed, non-adjustable temperature. This makes the system inflexible in being able to compensate for an undersized radiator.

(c) The system's design is based on assumptions and design approximations. It depends on air vent sizes that are chosen by approximation in order to attempt to provide even and timely steam distribution throughout the system. The installer will typically put small vents close to the boiler to slow steam from heating them up too fast, a medium sized vent in the room with the thermostat, and larger vents farther from the boiler to allow steam to travel at a faster rate to these further radiators, without regard to the precise requirements of each radiator, the room's thermal envelope, nor room size in which the radiator is located. This leads to substantial inefficiency, and a waste of energy in some rooms, and inadequate heat supply in others.

(d) The system does not have the ability to lower the heat in unoccupied rooms, nor increase the heat in others when required. In the case of an unoccupied room that is desired to be kept at a low temperature to save heating energy, the only way to lower the heat in that room would be to turn off the steam supply valve completely, eliminating all heat in the room; a partial closing the radiator supply valve can cause erratic system behavior, including the possibility of the radiator filling with condensate water and causing flooding.

(e) Radiator air vent valves suffer from mechanical failure and loss of tolerance over time from aging. The vents can often become clogged with rust and mineral deposits from the steam over time. In addition, the mechanical parts inside the valves that are designed to open and close the valve at specific temperatures fall out of precision over time. This results in their being stuck closed allowing no air to escape, resulting in a non-heat producing radiator, or stuck open or partially open, resulting in steam and water being released into the room and damage to flooring, walls, and other porous materials.

Advantages Over the Prior Art

Accordingly, several objects and advantages of the current innovation:
- a) The system has the ability to accurately control the temperature of every room in a dwelling to a high degree of precision, without major modifications to the heating system.
- b) The system converts previously single-zone steam heating systems into a multi-zone system, allowing for multiple points at which temperature readings are taken and each radiator's output precisely controlled, maintaining the desired temperature regulation in every room desired.
- c) The system can accurately regulate the temperature of each individual radiator, in every room; every radiator's effective heat output can be individually controlled through controlling the peak temperature the radiator is allowed to reach. This can make up for incorrectly sized radiators that are either bigger or smaller than specifications would normally require to be compensated for a specific sized room's given thermal envelope.
- d) The present system, through the accurate and timely control of air release from the radiators, minimizes the loss of any steam into dwelling rooms.
- e) The system will not go out of tolerance with age. It does not rely on thermally activated air valves, floats, or other mechanical devices that are prone to age-related tolerance changes. It will not go out of calibration, unlike its mechanical predecessors, ensuring that there are no cold, non-working radiators, nor leaky air vents that cause water and steam damaged rooms.
- f) The present method and apparatus is easily installed with minimal effort and expense in an existing system. Radiators' can be retrofit without the use of specialized tools or engineering ability.
- g) The present system takes up no additional room on the radiator, and requires no re-piping or modifications to the steam supply plumbing, minimizing or eliminating cosmetic repair costs after installation.
- h) The present innovation saves energy through the most efficient use of steam energy produced. It helps heat to be delivered to where it is needed and kept out of areas in where it is not.

Consequently, the reader will see that the present method has numerous advantages over the currently utilized temperature regulation systems commonly used in steam heating systems.
- a) It has the ability to regulate accurately individual room temperatures on a room by room, and zone by zone basis that will save significant amounts of money by avoiding overheating many of the rooms in a dwelling.
- b) Precise temperature regulation will virtually eliminate cold rooms, that otherwise might require supplemental heating devices to make them livable.
- c) The system requires minimal modification to the existing system, making it simple to install with minimal "damage" or secondary cost from an installation.
- d) The system utilizes relatively inexpensive parts in comparison to the cost of most heating system components and can be installed at minimal cost.
- e) The precise release of air from the radiators prevents excessive steam and water from escaping the radiators, eliminating damage to buildings, while ensuring proper operation.
- f) The system does not rely on fragile, mechanical parts that will easily get stuck or clogged from rust and mineral deposits—making the system very reliable, with longer service life.
- g) The system allows for operation on a multiple rooms per zone basis with a single temperature setting, while maintaining room by room temperature accuracy, providing every room in a building with individualized temperature regulation.
- h) The system optimizes itself over time. Through the retention of historic data relating to each heating cycle, the system tunes itself and "learns" to become more accurate over time, instead of going out of tolerance as it ages.
- i) The system can push undersized radiators to higher than normal operating temperature when required, allowing it to compensate for undersized radiator units or greater than expected demands for heat.

BRIEF DESCRIPTION OF SEVERAL VIEWS OF THE DRAWING

FIG. 8[A-K] are listings of the memory array structures the microprocessor's software utilizes in operation with sample data for illustrative purposes.

Figure 1:
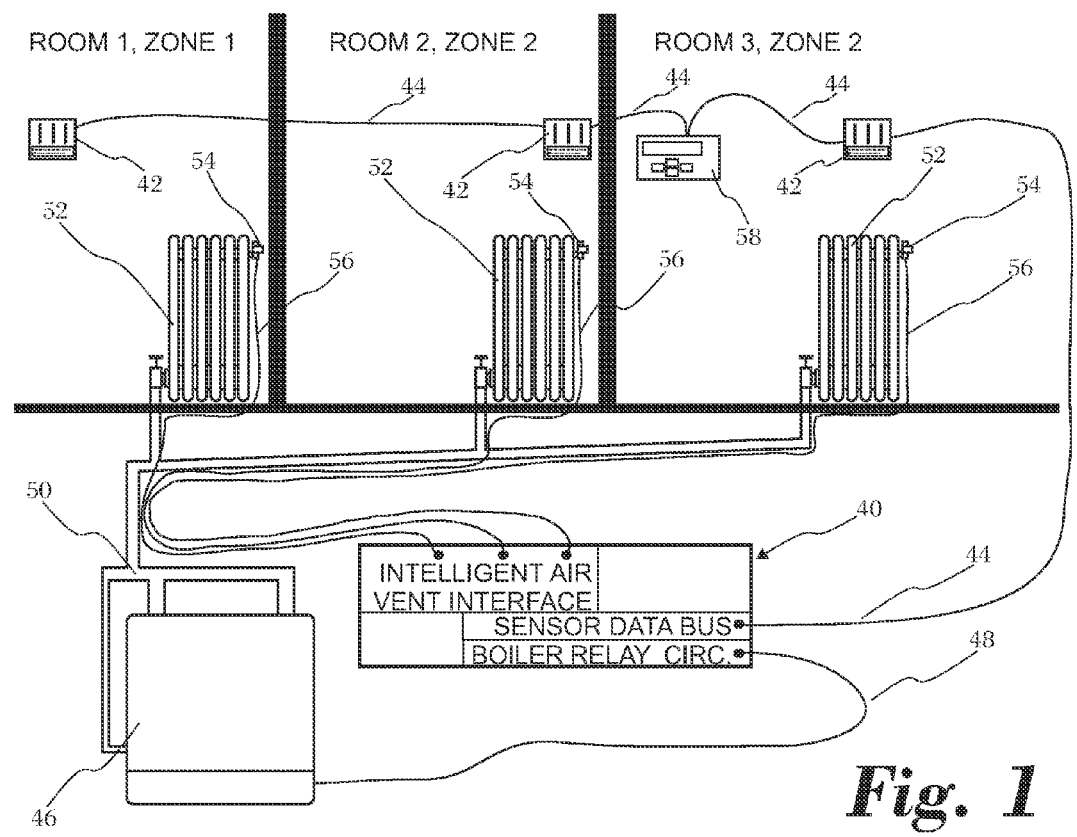
FIG. 1 is a schematic view of a typical steam heating system using the present invention.

DESCRIPTION OF FIGURE NUMERALS 40 control module
42 room temperature probe module
44 probe wire harness
46 steam boiler
48 two conductor thermostat wire
50 steam piping
52 radiator
54 intelligent air vent
56 air vent wiring harness
58 user interface module
60 elbow fitting
62 threaded air vent port
64 DS1820 temperature sensor
66 adhesive epoxy
68 intelligent air vent sensor wires
70 intelligent air vent connector
70A coil/sensor ground terminal
70B solenoid coil power terminal
70C valve data terminal
72 common ground wires
74 solenoid terminals
76 solenoid coil
78 valve plunger
80 valve seal
82 valve spring
84 valve inlet
86 valve body
88 valve outlet
90 valve vent
92 fixed size orifice
94 plastic shell base
96 DS1820 sensor for air vent
98 DS1820 pin 3
100 DS1820 pin 2
102 DS1820 pin 1
104A ground post terminal
104B data post terminal
106 ground conductor
110 data/power conductor
112 conductor entrance port
114 screw holes
116 sensor shell cover
118 air vent slot
120 unique label
122 user interface's plastic case
124 LCD display
126 up button
128 down button
130 left button
132 right button
134 enter button
136 control module enclosure
138 mains power terminals
140 transformer
142 rectifier/dc-dc filterer
144 embedded microprocessor module
146 boiler relay interface
148 air vent interface module
149A air vent terminal block—in
149B air vent terminal block—out
149C air vent power supply wire set
149D air vent data wire
149E air vent interconnect harness
150 temperature probe interface
152 LCD display
154 keypad buttons assembly
156 control module cover
158 punch-out for LCD display
160 punch-out for keypad assembly
162 screw holes
164 base screw holes
166 5 volts DC power bus
168 ground power bus
170 sensor data bus
172 resistor
174 boiler relay interface output
176 data bus
178 24 volts DC power bus
180 transistor
182 relay
184 diode
186 Boiler circuit contacts
188 buffering resistor
190 two wire connector
192 74LS164 IC
194 DS2408 IC
196 data connector
200 terminals to air vent interface
200a data bus terminal
200b 5 volts terminal 200c 24 volts terminal
200d ground terminal
202 terminals to boiler interface relay
202a boiler interface relay 5 volts terminal
202b boiler interface relay data terminal
202c boiler interface relay ground terminal
204 terminals to temperature probe module(s)
204a temperature probe ground
204b temperature probe data/voltage
206 reverse voltage protection diode

DETAILED DESCRIPTION OF THE PRESENT IMPROVEMENT

A preferred embodiment of the current method and apparatus of temperature control is illustrated in FIG. 1. A control module 40 is connected electrically in parallel through the probe wire harness 44 to one or more room temperature probe modules 42 that monitors individual room air temperatures. Also connected electrically in parallel to the probe wire harness is a user interface module 58 through which a user can interact with the control module.

The control module 40 is connected to a steam boiler 46 by way of the boiler's thermostat limit circuit terminals (not shown) via standard two conductor thermostat wire 48, allowing the control module to cause the boiler to start and stop producing steam pressure as required.

When steam is produced by the boiler 46, it is directed through a network of steam piping 50 and into all radiators 52 in the system. Each radiator is fitted with an electromechanical air vent valve, containing an embedded temperature sensor, referred to hereafter as an "intelligent air vent" 54. This intelligent air vent is shown in detail in FIG. 2. Each intelligent air vent is controlled and monitored by the microprocessor module, via the air vent wiring harness 56.

Figure 2:
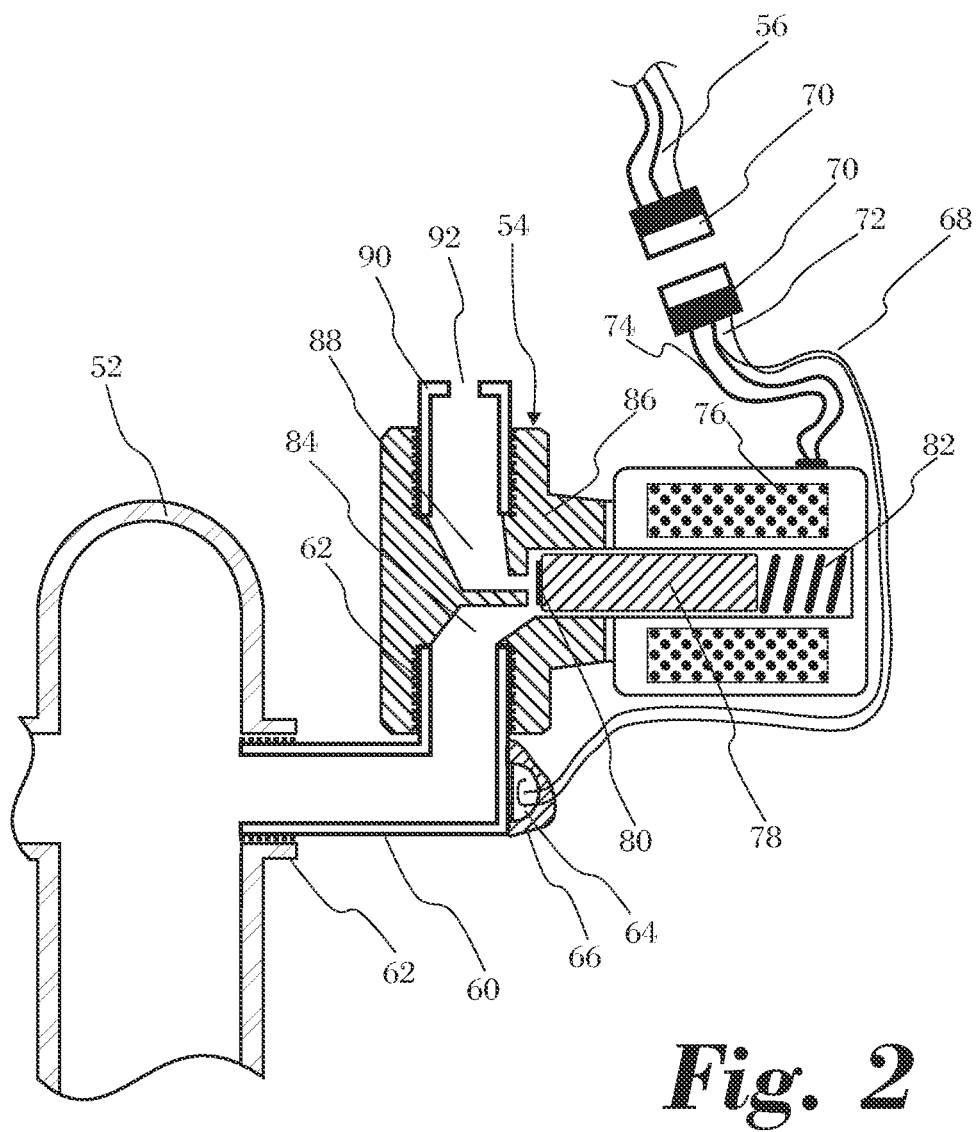
FIG. 2 is a sectional view of an intelligent air vent installed in a radiator.

FIG. 2 illustrates the parts that comprise the intelligent air vent assembly 54. The air vent is connected to each radiator's 52 air vent port 62 via a threaded elbow fitting 60. The elbow fitting is threaded to match the radiator's threaded connection, as well as the threading of the intelligent air vent valve body 86. In thermal contact with the threaded fitting is a DS1820 digital temperature sensor 64, held in place with adhesive epoxy 66. The temperature sensor is connected though a pair of wires 68 to a connector 70 to allow for easy installation and removal of the air vent from the air vent wiring harness 56.

The control module 40 can allow air to be displaced by the hot steam coming from the boiler into the radiator 52 by causing power to be sent through the air vent wiring harness 56, connected via connectors 70, through the solenoid terminals 74, and into the solenoid coil 76. This produces a magnetic field in the solenoid coil 76, drawing back the solenoid valve plunger 78 and the plunger seal 80, against the force of the plunger spring 82. Air is forced out of radiator 52, through the elbow fitting 60, into the valve inlet 84, past the now open valve seal 80, away from the valve body 86, and into the valve outlet 88. The air is buffered in its speed of release by the outlet vent 90. The fixed size orifice 92 slows the speed of the released air such that it does not make excessive noise.

Upon the control module determining that no additional air should be released from the radiator system, voltage is removed from the solenoid coil 76 by the control module, allowing the valves spring 82 to return the plunger and plunger seal to the closed position, preventing any further escape of air from the valve.

The ground wire from the temperature sensor and the ground wire of the solenoid coil are connected together into a common ground connector 72. The wiring harness 56 from each air vent goes to the control module 40 (FIGS. 1, 5A, and 6) and is attached to a dedicated port on one of the air vent interface modules 148 (FIGS. 5A, 6, and 7F) located within the control module. The wires of the wiring harness 56 are attached to an air vent interface port terminal block 70 (FIG. 7F), containing a ground terminal 70A, valve data terminal 70C, and solenoid coil power terminal 70B.

Figure 3A:
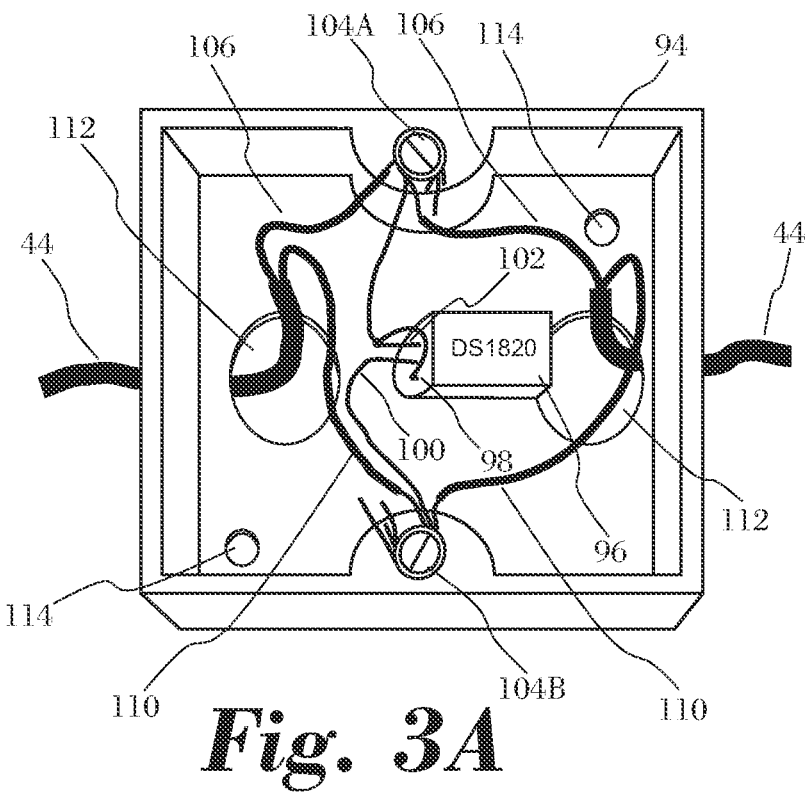
FIG. 3A is a perspective view of the temperature probe module.
Figure 3B:
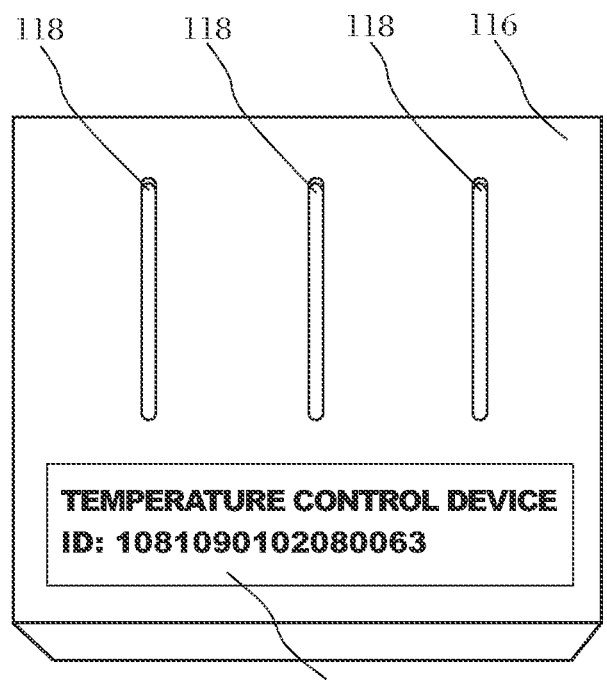
FIG. 3B is a perspective view of the cover of the temperature sensor probe module.
Figures 5A, 5B:
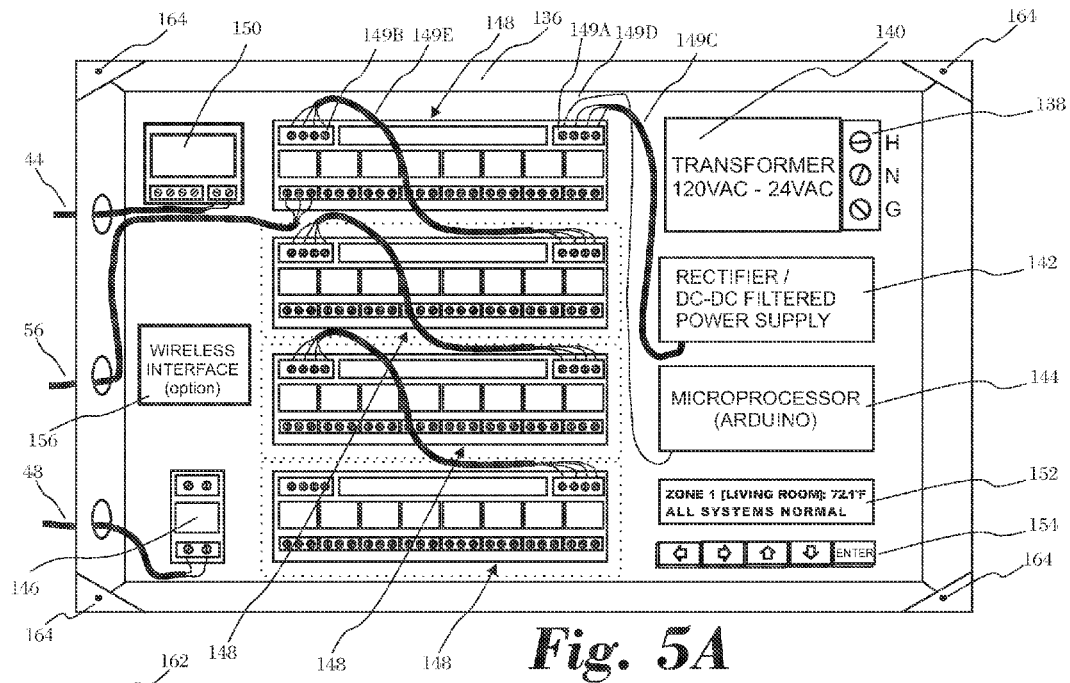
FIG. 5A is a perspective view of the control module enclosure and peripheral modules.
FIG. 5B is a perspective view of the cover of the control module enclosure.
Figure 6:
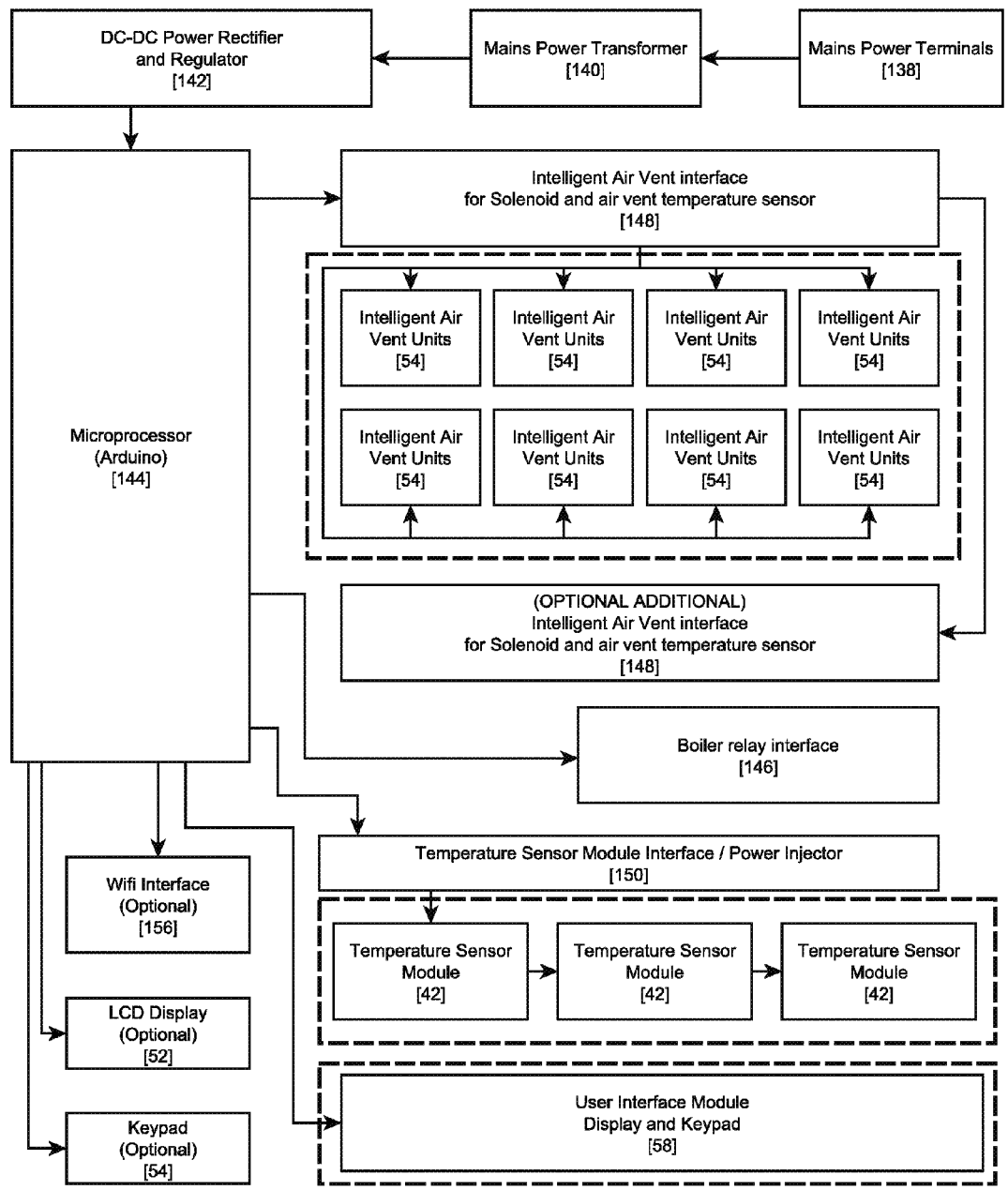
FIG. 6 is a schematic block circuit diagram of the interconnections between the microprocessor and its peripheral circuitry.

FIGS. 3A and 3B show in detail one of the temperature probe modules 42 (FIG. 1). The temperature probe module in FIG. 3A consists of a plastic shell base 94 in which a digital temperature sensor 96 is mounted, such that the sensor is supported by its leads, 98, 100, and 102 and allowed to be suspended freely, kept from making contact with its plastic case. In accordance with the specifications for the temperature sensor, the leads 98 and 102 are electrically connected together, and attached to a terminal screw post 104A. The middle terminal of the temperature sensor 100 will carry the data input and output, as well as power for the sensor 96. This lead 100 is connected to a terminal screw post 104B, so that it makes electrical contact with the data/power conductor 110 of the sensor wiring 44. The sensor wiring enters through a conductor entrance port 112 from the rear of the plastic shell base 94. The shell can be affixed to a wall with screws placed through screw holes 114. Any number of temperature sensor modules and wires can be connected in series to the terminal posts 104A/104B and set up to be read individually by the control module's software. The probes wire harness 44 (FIGS. 1 and 3A) terminates in the control module at the temperature sensor interface 150 (FIGS. 5B and 6). The temperature sensor interface terminal block 204 (FIGS. 6 and 7A) supplies ground 204A and data/power connections 204B for the thermostats, and provides electrical connection to the microprocessor module 144.

The plastic shell base 94 of the temperature sensor module is covered by the sensor shell cover 116 (FIG. 3B) for both aesthetic and protective reasons. Air vent slots 118 allow air to freely pass through the cover 116 so that the temperature sensor 96 can have an accurate temperature reading of the surrounding air. The sensor has a unique label 120 affixed to it so that it is identified as a temperature sensor, and so that the unique serial number encoded by the manufacturer of each digital temperature sensor can be known without difficulty.

Figure 4:
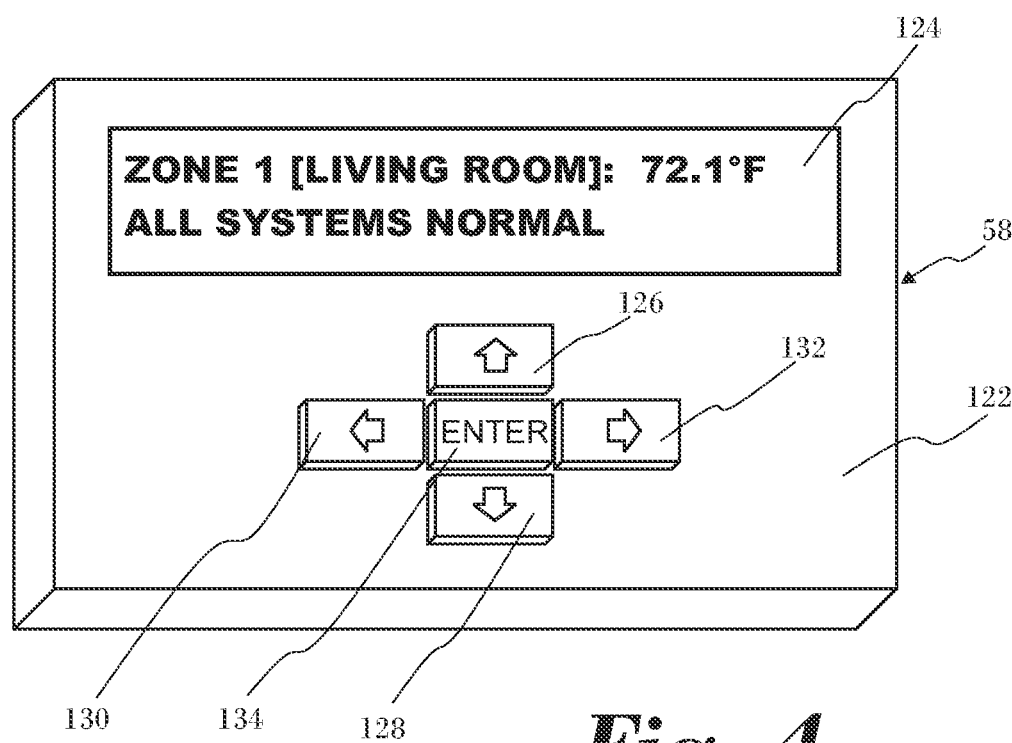
FIG. 4 is a perspective view of a user interface control module.

FIG. 4 depicts the user interface module 58 through which a user can interact with the control module. It consists of a number of parts mounted in the user interface's plastic case 122, including an LCD display 124 that shows the user the current temperature of each zone, allows for setup of zones, radiators, and temperature sensor modules, and lets the user set various parameters that control how the control module makes decisions in regulating temperatures. The user can navigate through the software menus and interact with the control module through the up 126, down 128, left 130, right 132, and enter 134 buttons.

FIG. 5A depicts the inside view of the control module's component's layout. All the parts of the control module are mounted in the control module's enclosure 136. As shown in FIG. 5A and FIG. 6, 120 volts AC from the utility service (not shown) is connected to the mains power terminals 138, which supplies the transformer 140 with voltage that is then converted into 24 volts AC. The 24 volts AC is rectified into 24 volts DC to power the solenoid coils in the intelligent air vents, and 5 volts DC to power the remainder of the circuitry by the rectifier/dc-dc filtered power supply 142. An Arduino microprocessor module or similar type of embedded microprocessor 144 is powered by the rectified power from the power supply 142, and connected to a number of peripheral modules, including a boiler relay interface 146 that can make or break the boiler's 46 burner circuit, any number of intelligent air vent relay and sensor interfaces 148 that can be wired electrically in parallel, a temperature probe interface module 150 used to connect any number of temperature probe modules electrically in parallel, an optional LCD display 152 and keypad buttons 154 that can mimic the interface functions of the user interface module and allow for a user to interact with the controller, and a wireless interface module allowing for wireless connectivity of one or more modules, as well as the interaction and controlling of the controller via other wireless and third party devices. FIG. 5B shows the control module cover 156, containing punch-outs for the LCD display 158 and keypad 160. The cover is secured to the base with screws through the screw holes 162 into the mating enclosure base holes 164.

Figure 7A:
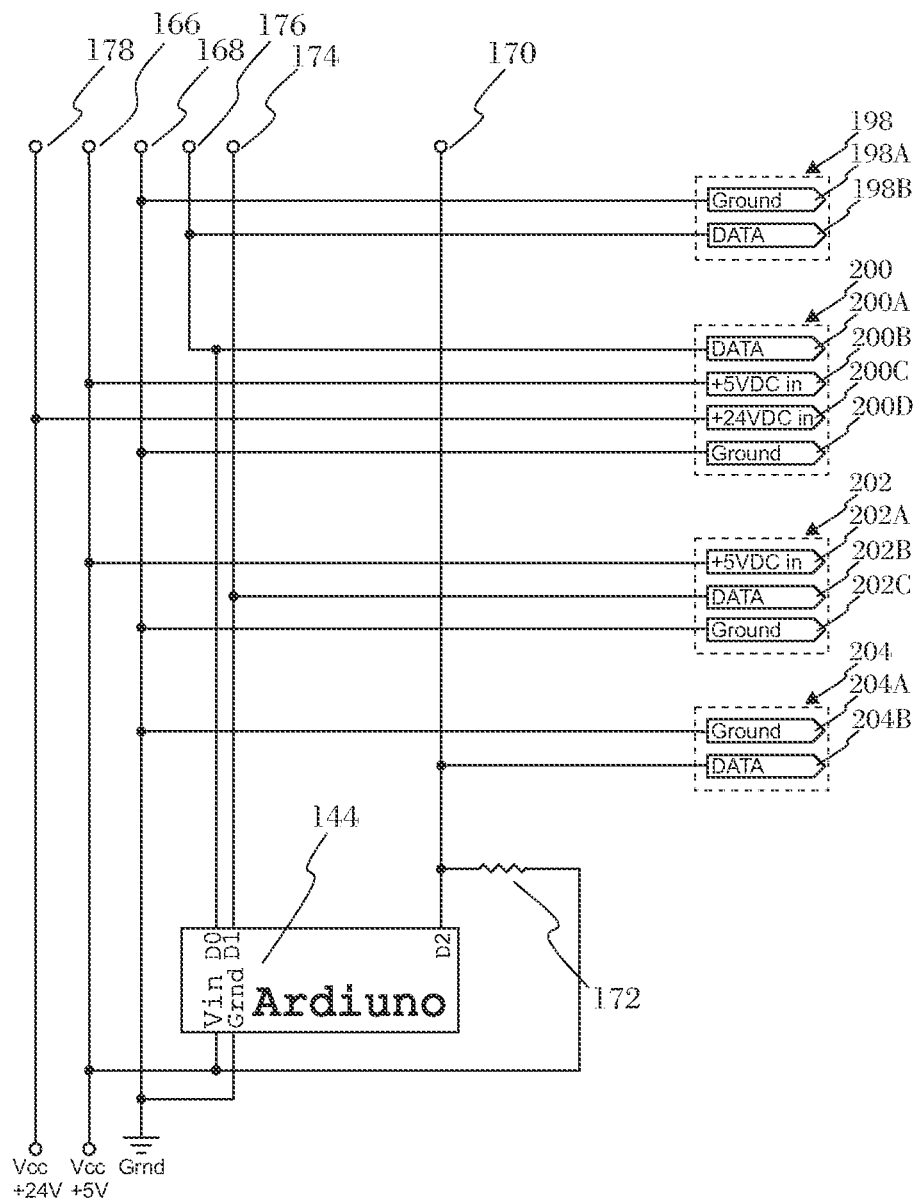
FIG. 7A is an electronic schematic of the microprocessor module and the layout of the system buses through which voltage and data are transmitted internally in the microprocessor module.
Figure 7B:
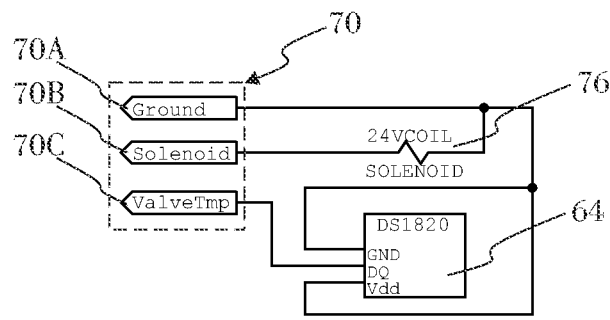
FIG. 7B is an electronic schematic of the intelligent air vent solenoid and integrated temperature probe.
Figure 7C:
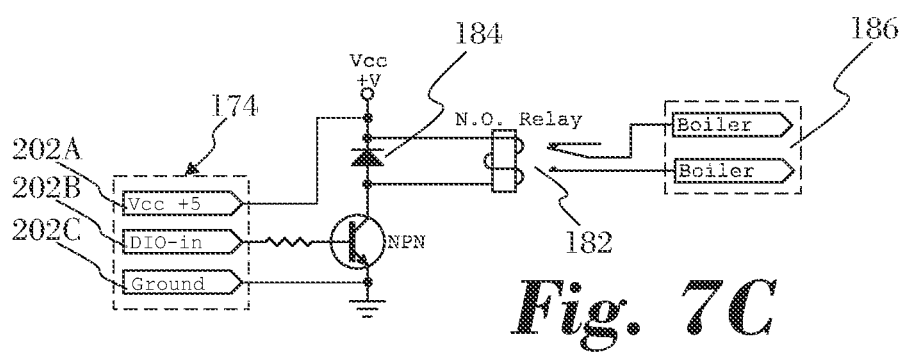
FIG. 7C is an electronic schematic of the boiler control relay interface.
Figure 7D:
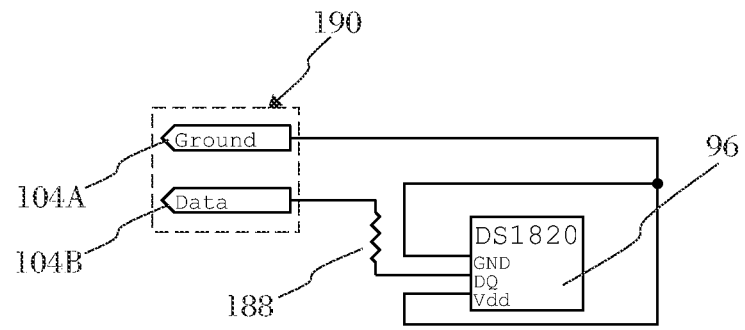
FIG. 7D is an electronic schematic of a temperature probe module.
Figure 7E:
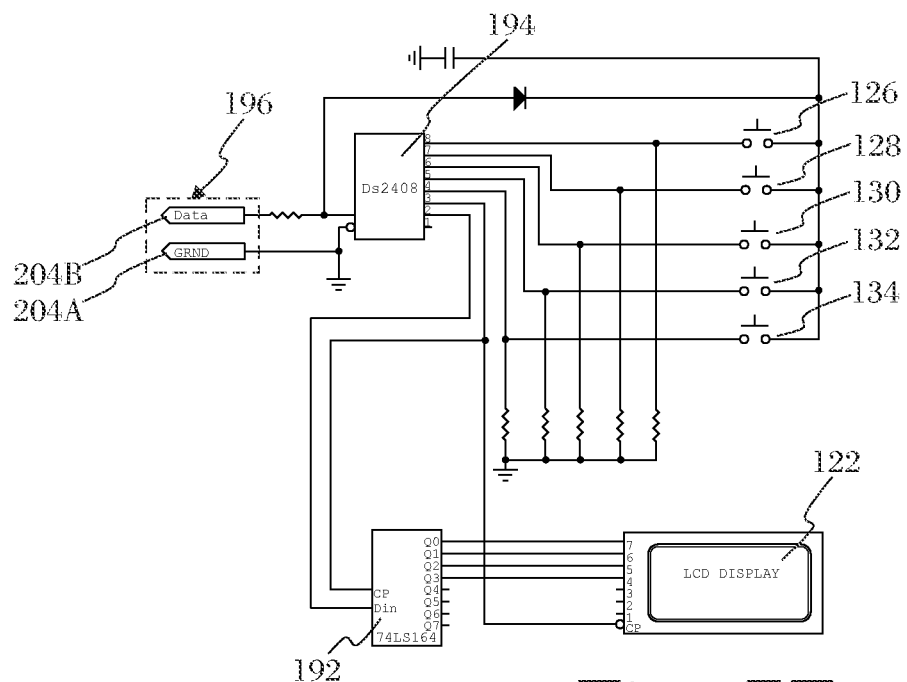
FIG. 7E is an electronic schematic of the user control interface module.
Figure 7F:
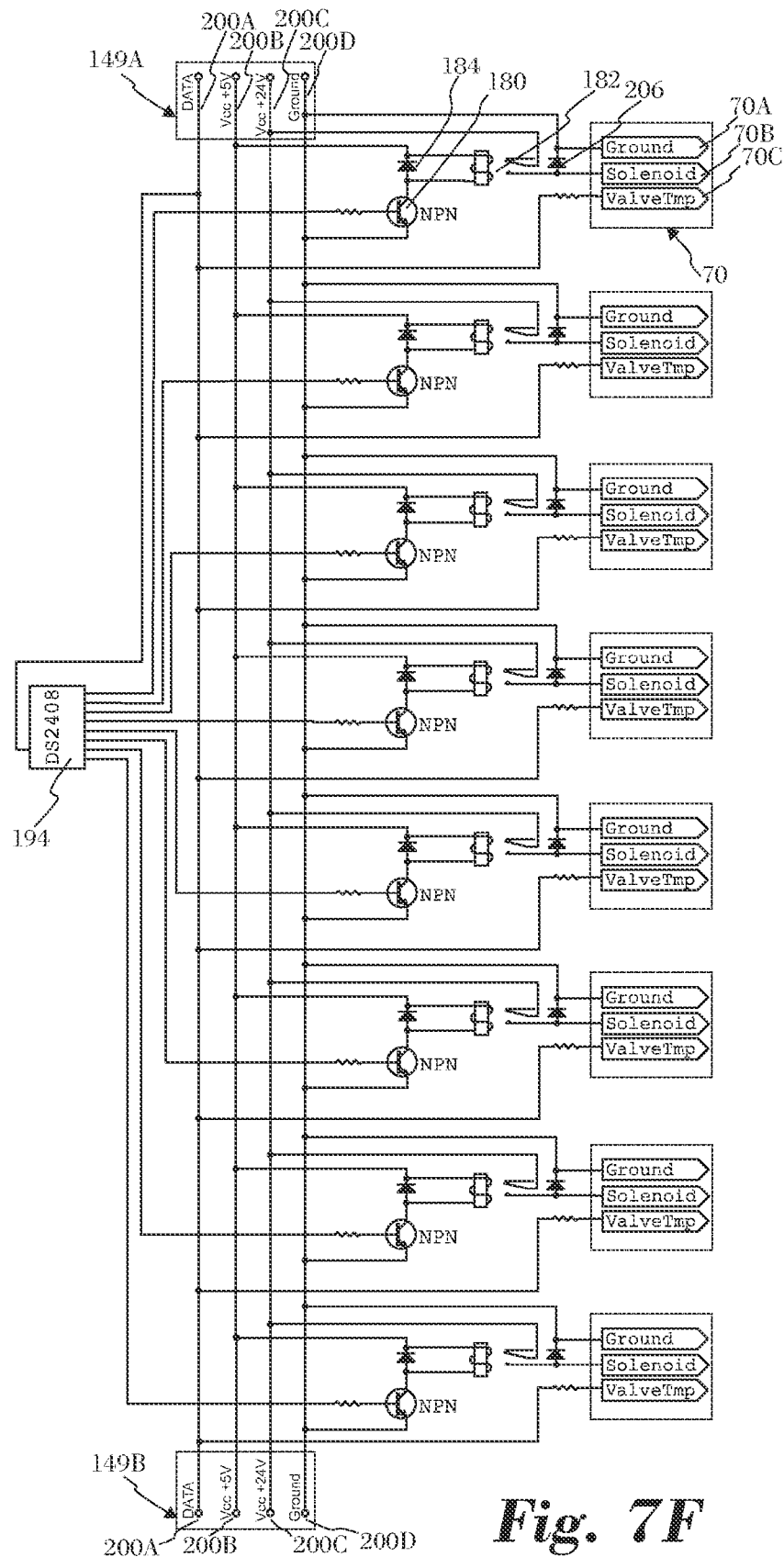
FIG. 7F is an electronic schematic of an intelligent air vent interface module.
Figure 9:
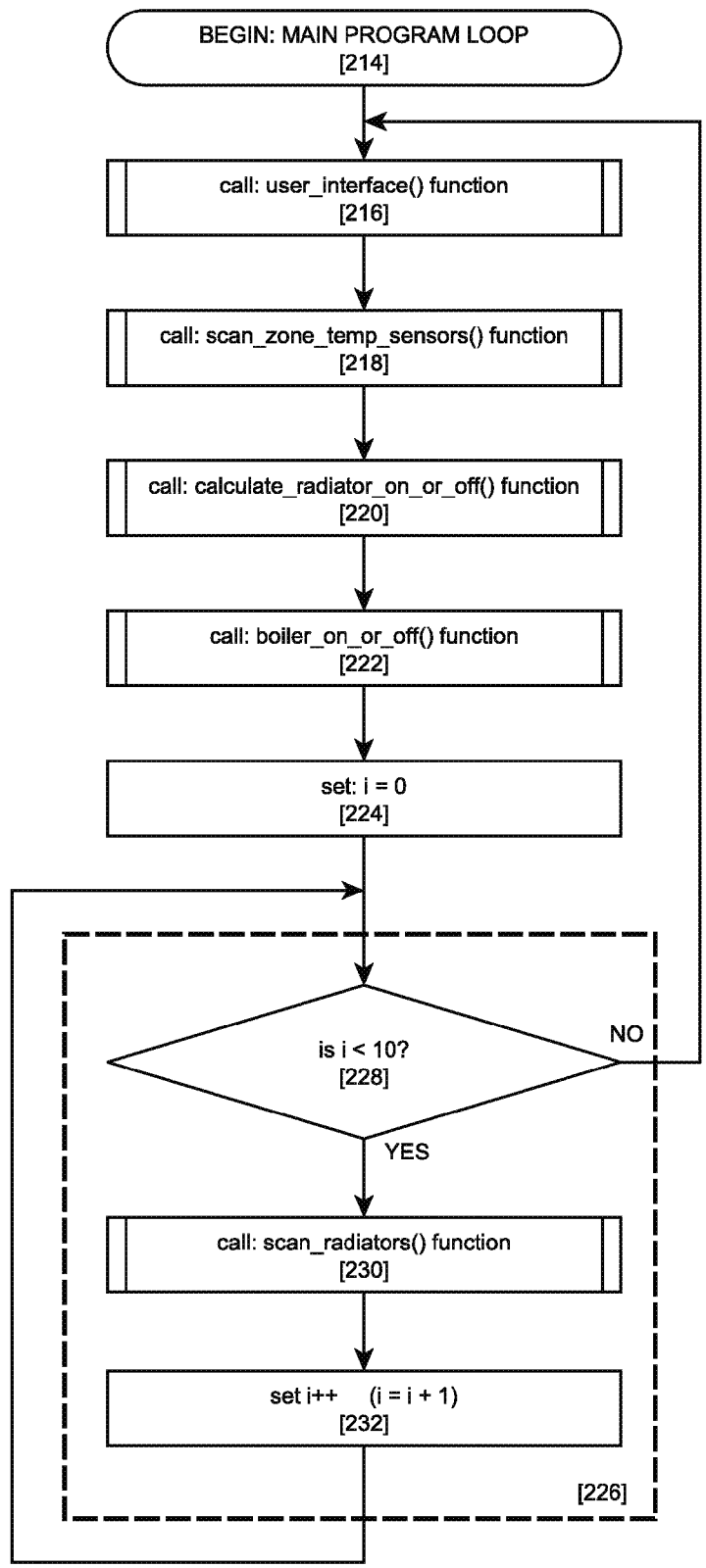
FIG. 9 is a flowchart of the main program loop used to operate the microprocessor.

Each intelligent air vent 54 (FIGS. 1, 2, and 7B) requires a unique port on an air vent interface module 148 (FIGS. 5, 6, and 7F). The first interface module is connected to the microprocessor 144 by a data wire 149D and power supply 142 by a power supply wire set 149C. Any number of air vent interface modules 148 can be connected electrically in parallel. To accomplish this, electrical terminals to input power and data for each air vent interface module are replicated on both sides 149A/149B so that they can connect one interface module to the next by an interconnect harness 149E.

FIG. 6 shows how the parts of the control module interact. 120 volts AC is supplied to mains power terminals 138, which, in turn, powers the primary of the mains power transformer 140. The voltage is stepped down by the transformer 140 to 24 volts AC, where it is rectified into required DC voltages of 5 and 24 volts by the DC to DC power rectifier and regulator 142. The microprocessor 144 is powered by the power supply, which in turn controls any number of serial linked intelligent air vent interface modules 148. Up to eight Intelligent Air Vents 54, which each include both a 24 volt DC solenoid valve and digital temperature sensor, are attached to a dedicated port on an air vent interface module 148. A boiler relay interface 146 provides a set of dry relay contacts, capable of turning on and off the steam boiler's heat source, and thereby steam pressure, as required by the microprocessor 144. Any number of temperature sensor modules 42 can be attached to the microprocessor's serial data bus via the temperature sensor module interface/power injector 150 which also supplies power necessary to operate each temperature sensor module 42. Any number of user interface modules 58, each containing a keypad and display, can be connected to either the temperature sensor module interface 150 or an independent serial data connection with the microprocessor 144, as shown. An embedded LCD display 52 and keypad 54 can also be integrated into the control module unit. An optional Wi-Fi wireless Ethernet adapter interface 156 can allow wireless interaction and interfacing with the control module.

FIG. 7[A-F] shows the individual circuits and sub-assemblies that make up the control module and the devices it communicates with, and controls.

FIG. 7A shows the microprocessor circuit, and its input/output connectors. The board is supplied by the power regulator 142 (FIG. 6) that feeds the boards power buses, providing 24 volts DC 178, 5 volts DC 166, and a ground 168. In addition, there are several digital I/O pins from the Arduino processor 144 connected to data buses, including a general data communication bus 176, a data bus for the boiler relay interface 174, and a powered data bus 170 for communication with the temperature probe modules and user interface modules.

A general purpose data bus terminal block 198 provides data 198A and ground 198B connectors to attach peripherals such as a Wi-Fi interface 156, LCD Display 52, and keypad 54 (FIGS. 5 and 6).

Intelligent air vent interface modules are attached via a terminal block 200 that provides data connectivity to the processor 200A, +5 volts 200B, +24 volts 200C, and ground 200D. This terminal block 200 is connected to the air vent interface modules 148 (FIGS. 5A, 6, and 7F) through the first interface's terminal block connector 149A by the air vent power wire set 149C and data wire harness 149D.

The boiler relay interface module is connected by a terminal block 202 that provides +5 volts 202A, a digital output connection 202B from the microprocessor that can be switched on or off, and a ground 202C terminal. The terminal block 202 on the microprocessor module is wired to the boiler relay interface module's respective terminal block 174 (FIGS. 5A, 6, and 7C) consisting of the same terminal layout.

The temperature sensor probes wire harness is attached to a terminal block 204 that provides data and power over the same wire 204A, and a ground 204B. Power is supplied to this bus by a resistor 172, supplying power from the +5 volt power bus 166. This configuration of the resistor 172 and terminal block 204 is referred to as the temperature sensor probe interface 150 (FIGS. 5 and 6). This terminal block 204 is connected to each temperature sensor's connectors 190 (FIGS. 3A, 6, and 7D) by the temperature probe wire harness 44 (FIGS. 1 and 3A).

FIG. 7B shows the circuit behind one of the intelligent air vents 54 (FIGS. 1 and 2). It consists of a 24 volt DC powered solenoid 76 that can open the air valve when powered and a temperature probe 64. This unit is connected to a unique port of the intelligent air vent interface module 148 by its connector 70 (FIG. 7B), such that it can be addressed and its temperature read individually by the microprocessor. The conductors in each intelligent air vent's terminal block are wired to their like conductors in the matching terminal block of the air vent interface 70 (FIG. 7F).

FIG. 7C shows the boiler relay interface 146, consisting of a digital input from the microprocessor 174, a transistor 180 to provide switching power for the normally open relay 182, and back current protection via a diode 184 to protect the transistor. Boiler circuit contacts 186 complete the boiler 46 (FIG. 1) circuit when closed. The boiler relay interface is connected via its terminal block 174 to the boiler relay interface terminal block on the microprocessor module 202 (FIG. 7A).

FIG. 7D shows the wiring of the temperature probe module 42. It consists of a DS1820 temperature sensor 96, a buffering resistor 188, and two wire connectors 190 to be connected in parallel to the temperature sensor data bus 170. The terminal block 190 for each sensor consists of a set of screw posts that are wired to the temperature probe interface located on the microprocessor module via a probe wire harness 44 (FIGS. 1 and 3A) connected to the interface terminal block conductors 204 (FIG. 7A). Additional temperature probe modules are wired in a chain, attaching additional probe wire harnesses 44 between the probe module's terminal blocks 190.

FIG. 7E shows the User Interface Module's 58 circuitry. It consists of an LCD display 122 driven by an 8-Bit Serial In/Parallel Out Shift Register integrated circuit such as the 74LS164 produced by Fairchild Semiconductor 192, five push buttons 126, 128, 130, 132, 134, an addressable 1 wire, 8 channel switch such as a DS2408 integrated circuit produced by Maxim Integrated 194, and a data connector 196 to be attached to the temperature sensor module bus 170 (FIG. 7A) via the probe wire harness 44 (FIG. 1).

FIG. 7F shows the circuitry for an intelligent air vent interface module. Data and power to the interface module is supplied via its terminal block 149A. The first interface module is connected directly to the microprocessor as previously described, with additional interface modules being connected electrically parallel via mirrored terminal blocks located at either end of the board 149A/149B. Serial data is input into the 8 channel serial to parallel switch DS2408 IC 194. This allows each switching transistor 180 to be individually addressed. Each switching transistor powers a normally open relay 182 that provides 24 volts DC to the terminal block's 70 power terminal 70B that is connected to the positive side of the intelligent air vent solenoid coil 76 FIGS. 2 and 7B). The negative side of the solenoid coil is connected to the ground terminal 70A. Transistor protection from the relay coil is provided by a diode 184, as well as reverse voltage protection for the solenoid coil by another diode 206. Data from the temperature sensor 64 is provided through the valve temperature terminal 70C to the data bus 200A, so that the microprocessor can read it.

FIG. 8[A-J] shows sample data for a hypothetical three zone heating system; this data exists for illustrative purposes only and exists to help better explain the inner workings of the software flowcharts (FIGS. 9 through 18). FIG. 8K shows three input/output functions that the software can call to interact with the digital input/output pins of the microprocessor.

FIGS. 9 through 18 show the workings of the software that the microprocessor runs. Starting with the embodiment depicted in FIG. 9, the main program loop 214 sets up a loop and runs continuously. Within this loop are a number of functions necessary to maintain the proper operation of the system, starting with the function that is responsible for interacting with the user control module through the USER_INTERFACE( ) function 216. The SCAN_ZONE_TEMP_SENSORS( ) function 218 performs a reading of all current room temperatures of each temperature probe module 42 (FIGS. 1 and 3A), and stores the readings in a data table depicted in FIG. 8I under "sensor_value" for each sensor idx number, for later use in the program. The CALCULATE_RADIATOR_ON_OR_OFF( ) function is then called determining the correct positioning of each air vent solenoid valve based on specific criteria. The BOILER_ON_OR_OFF( ) function 222 determines and switches the boiler relay interface 146 (FIGS. 5 and 6), and thereby the boiler 46 (FIG. 1), on or off. A loop 226 is started by initializing a temporary variable i with a starting number of 0 224. This loop ensures that the high priority function SCAN_RADIATORS( ) 230 is run 10 times more often, than other less important functions, through incrementing variable i 232 by 1 with each pass, and then comparing its value until it is equal to 10 228. Once this function has run 10 times, the MAIN PROGRAM LOOP function restarts from the beginning, starting with calling the USER_INTERFACE( ) function 216 and so forth as described.

Figure 10:
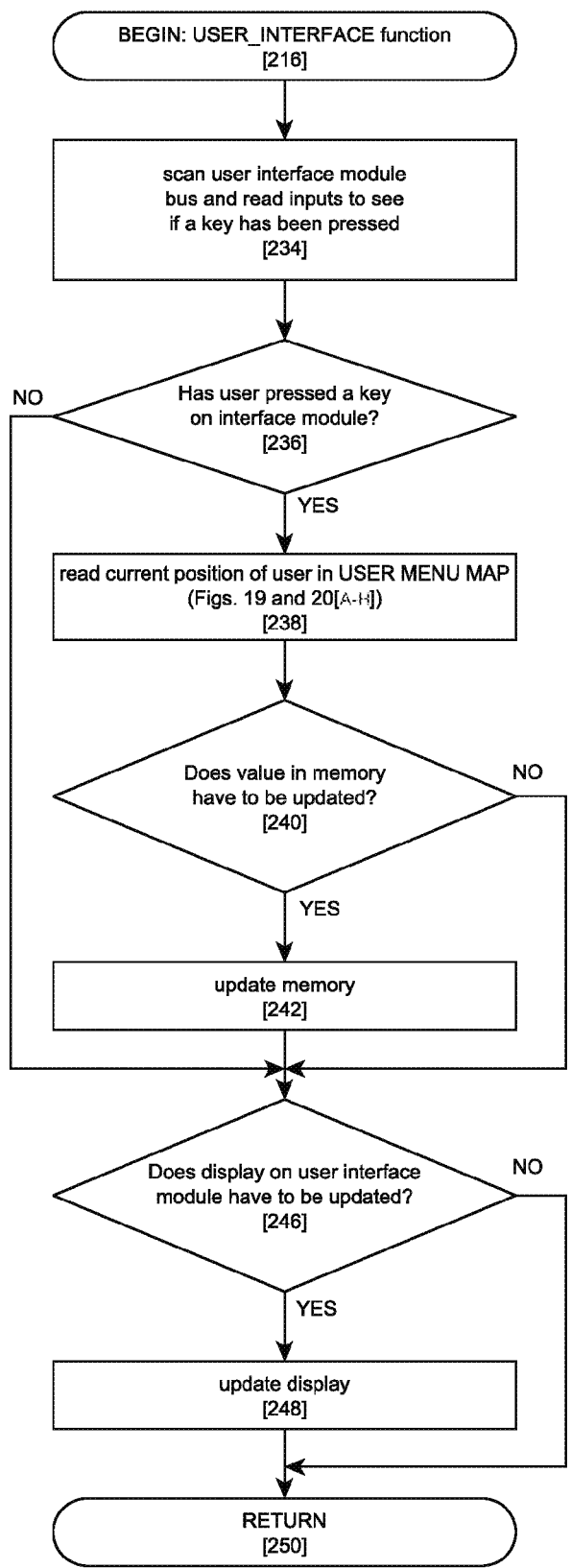
FIG. 10 is a flowchart of the function used to interact between the microprocessor module's settings and the user interface module.

FIG. 10 shows the program functions of the USER_INTERFACE ( ) function 216. This function starts with a scan of the sensor data bus to see if any of the keys on the user control module 58 (FIGS. 1 and 4) have been pressed 234. If a key has been pressed, the current position in the menu system 238 is determined based on the user menu flowcharts FIGS. 19 and 20[A-H]. If a user's selection requires a change of function in the menu map 240, then the position of the user in the menu map is updated 242. If any of these changes require a screen update 246, then the user control module LCD display 124 (FIG. 4) is updated 248. Otherwise, if no keys have been pressed 236, the program proceeds to see if the display requires updating 246. The function then returns to the calling function 250.

Figure 11:
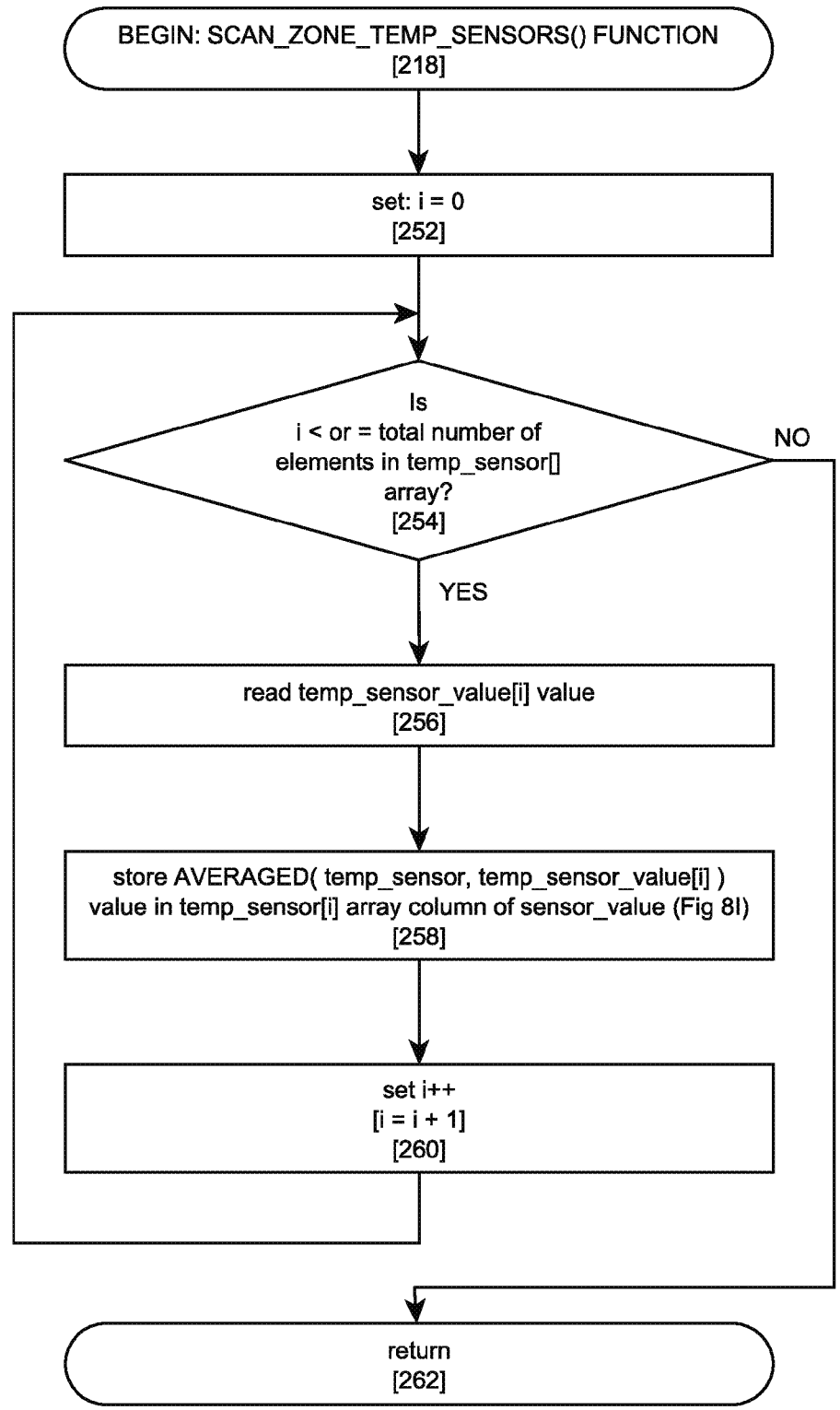
FIG. 11 is a flowchart of the function used to read temperature probe modules.

FIG. 11 shows the SCAN_ZONE_TEMP_SENSORS( ) function 218. This function reads the actual temperature probe temperatures data individually and averages the new temperature reading into a table of each respective probe's readings. A temporary counter variable i is set to 0 252. A loop is then set up such that if i is less than the number of temperature probes in the system, the next successive temperature probe's value will be read. The number of probes in the system is determined by finding the number of rows in the temp_sensor [n] data array 254 shown in FIG. 8I. Providing that this statement is not satisfied, each temperature probe sensor's 96 (FIG. 3A) value is read 256, and averaged into historic readings using a weighted average function described in FIG. 16 334. This averaged number is then stored in the same array of temp_sensor[n] in the column of sensor_value 258, replacing the original value. Variable i is incremented 260, and the loop continues 254 until all sensors in the system have been read. The function then returns 262 to the calling function.

Figure 12:
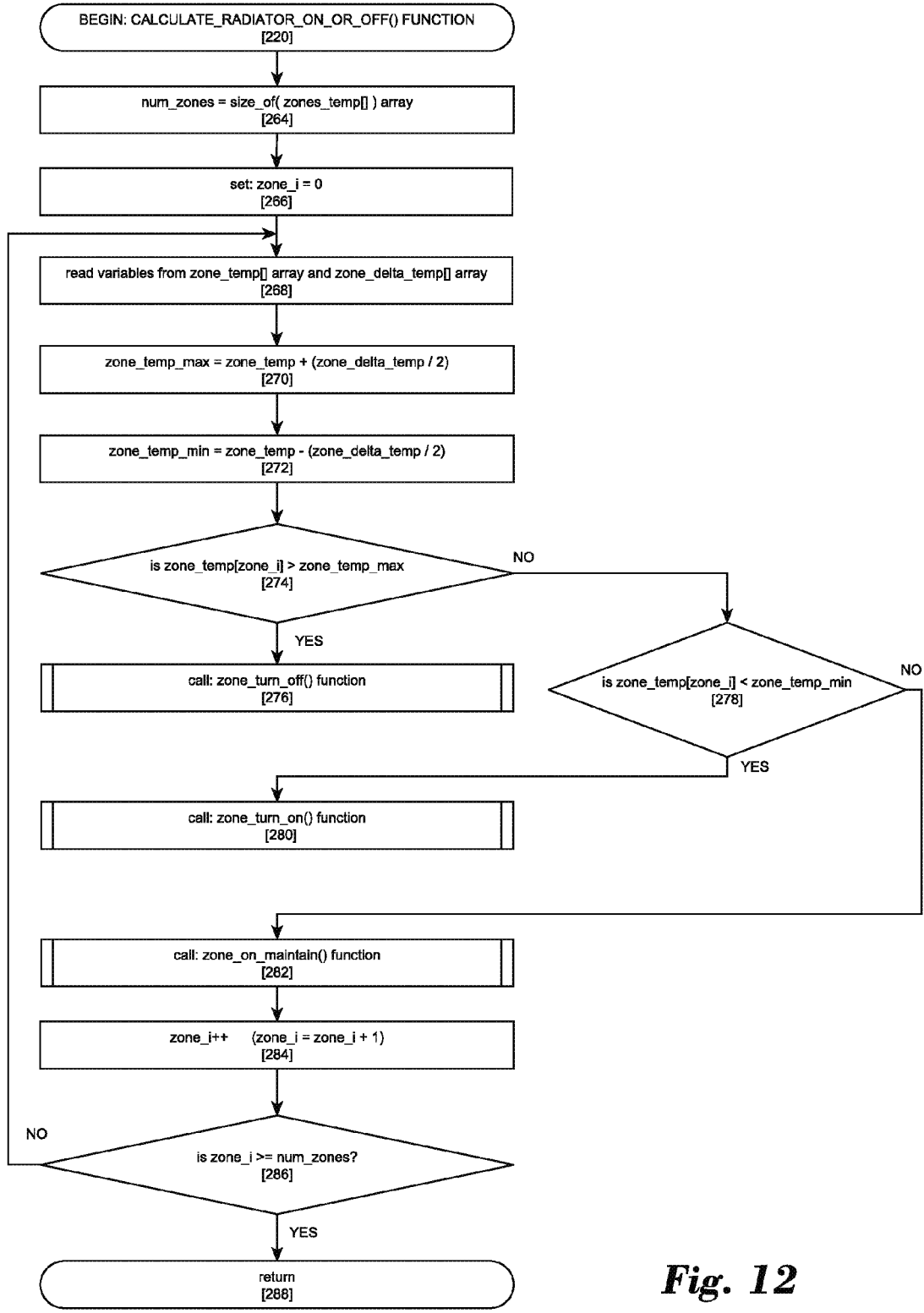
FIG. 12 is a flowchart of the function "CALCULATE_RADIATOR_ON_OR_OFF" that determines which radiators should be producing heat, and which ones should not.

FIG. 12 describes the CALCULATE_RADIATOR_ON_OR_OFF( ) function 220. This function starts by finding the number of zones in the zone_temp[n] array shown in FIG. 8B 264. A temporary variable, zone_i is set to 0 266. The variables for each zone, as determined by the zone_i value are read from arrays zone_temp (FIG. 8B) and zone_delta_temp (FIG. 8C) 268. The maximum and minimum temperature each zone should be allowed to rise to or fall to is set in zone_temp_max 270, and zone_temp_min 272 respectively, by taking the current target zone_temp and adding or subtracting half of the zone_delta_temp value, yielding the allowable change above and below the desired temperature the system will tolerate before turning generation off or on for that specific zone. If the stored zone_temp value for the current zone has risen above the zone_temp_max value 274, then the ZONE_TURN_OFF( ) function 276 is called to turn off the current zone. Otherwise, if the statement is not satisfied 274, then a determination of the zone_temp value is below the zone_temp_minimum 278 value, in which case the ZONE_TURN_ON( ) function is called to turn the current zone on. If this statement 278 is also not satisfied, then the ZONE_ON_MAINTAIN( ) function (FIG. 15) is called to monitor and control the intelligent air vent's 54 solenoid valve position so that the radiator does not get excessively hot or become saturated with steam and release it into the room. Once the zone has been processed, the variable controlling the current zone to be processed, zone_i, is incremented. Providing this is not the last zone 286 in the zone_temp[n] array, the loop continues, processing the next zone 268, until all the zones have been processed. After all the zones have been processed in the zone_temp[n] array, the function returns to the calling function 288.

Figure 13:
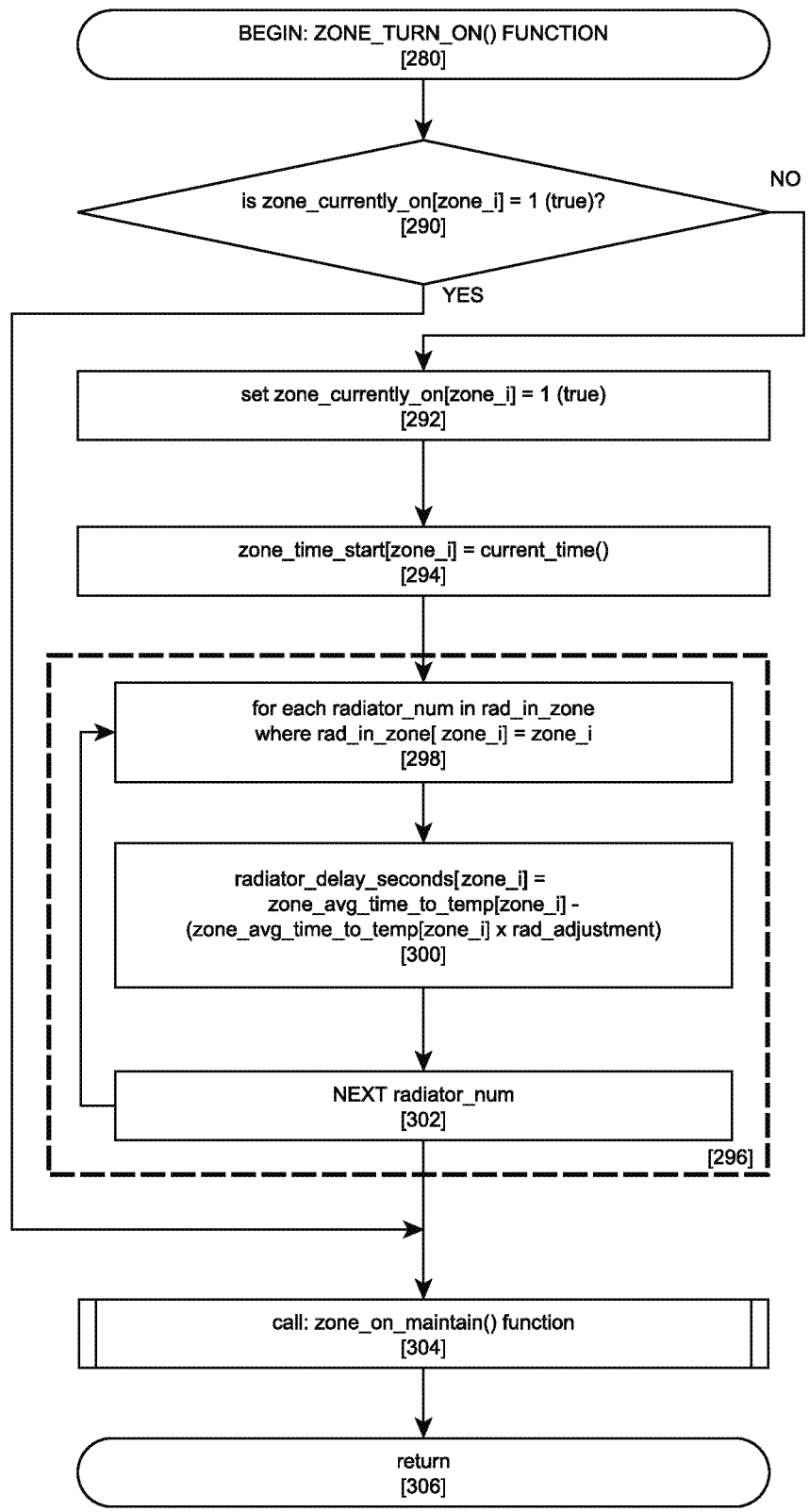
FIG. 13 is a flowchart of the function "ZONE_TURN_ON" that is triggered when a zone should be producing additional heat.

FIG. 13 shows the ZONE_TURN_ON( ) function 280. This function sets a Boolean TRUE (on) indicator, for each radiator listed in the radiator_on[n] data array (FIG. 8G), that is located in a zone that has been determined to require heat as indicated by a TRUE (on) indicator in the zone_currently_on [n] array for each zone in the system. If the zone_currently_on[n] (FIG. 8A) row for the zone is set to true (on) 290, then no action is required, and the function calls the ZONE_ON_MAINTAIN( ) function 304, and returns to its calling function 306. Otherwise, if the zone_currently_on[n] array (FIG. 8A) is set to FALSE (off) 290, the zone_currently_on[n] value is changed to TRUE (on) 292 in the data array for the current zone (FIG. 8A). A timer is initialized for the zone by recording the microprocessor's current time in POSIX time, as zone_time_start[n] value (FIG. 8E), for the zone number being processed 292. POSIX time is defined as the number of seconds that have elapsed since midnight Coordinated Universal Time, Jan. 1, 1970. A foreach loop is run for each radiator assigned to the current zone 296. For each row of the array rad_in_zone[n] (FIG. 8F) where the zone_i column value is equal to the current zone_i variable value (the current zone being processed), the variable radiator_num is set to equal the column value of radiator_num 298. A delay time to wait before turning on each individual radiator within the current zone, from the time the zone is requested to produce heat, is calculated in seconds. This value is based on how long the zone last took in seconds to reach its desired target temperature, stored in zone_avg_time_to_temp[n] (FIG. 8H) minus this value multiplied by a user settable percentage of lower heat output desired for each radiator that is stored in the array rad_adjustment[n] (not shown) 300. The next radiator in the zone_i is then called 302 until all the radiators in that zone have been processed 296. Then, the ZONE_ON_MAINTAIN( ) function is called 304, and the function is allowed to return 306.

Figure 14:
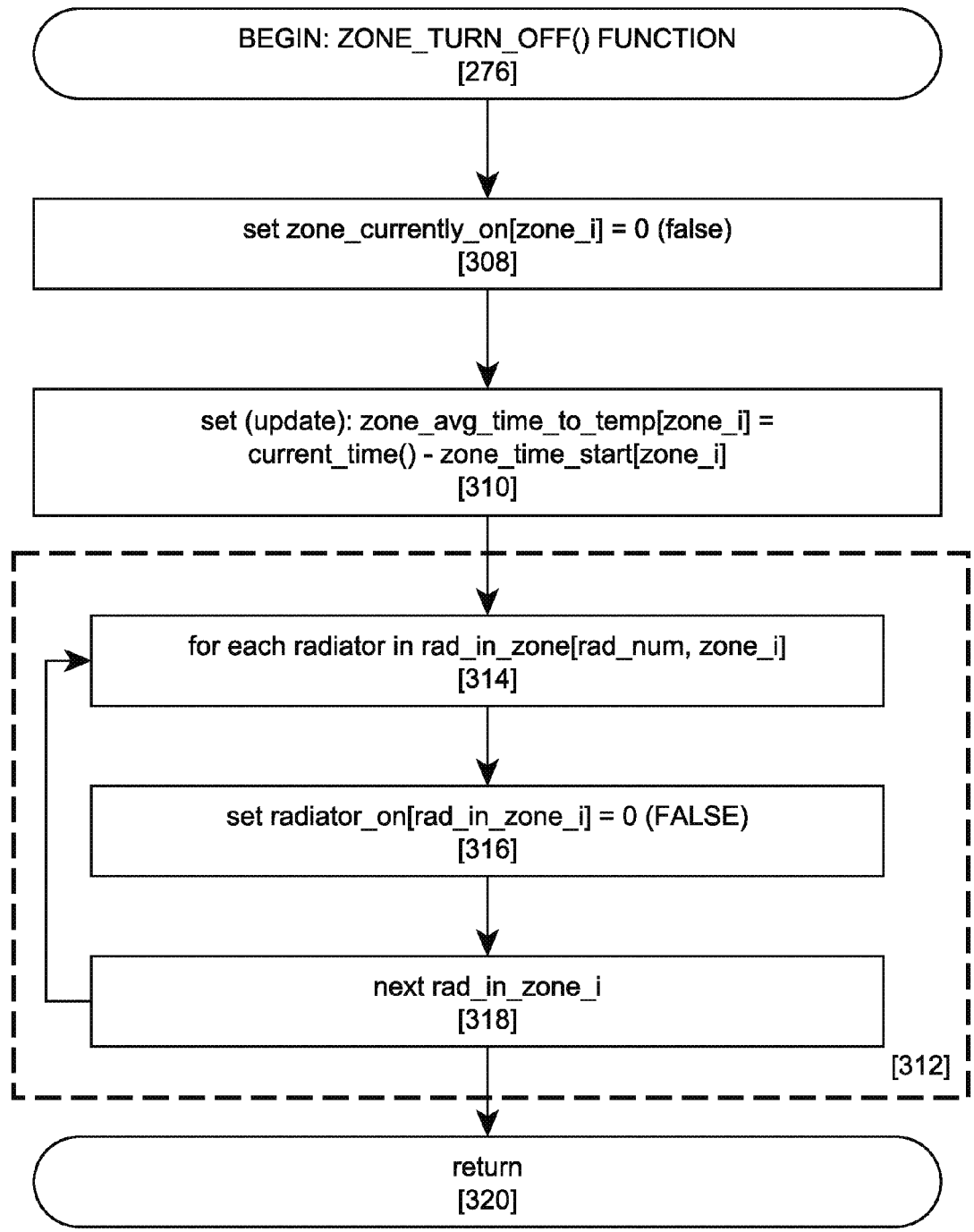
FIG. 14 is a flowchart of the function "ZONE_TURN_OFF" that is triggered when a zone's heat demand has been satisfied.

FIG. 14 shows the ZONE_TURN_OFF( ) function 276. This function sets the status of each radiator in the zone, stored in the radiator_on[n] array (FIG. 8G) to FALSE (off) when called. First, the value of the row associated with the current zone in the zone_currently_on[n] array (FIG. 8A) is set to FALSE (off) 308. Then, the time required to heat the zone being processed is recorded by finding the difference between the zone start time stored in zone_time_start[n] and the processor's current time 310. A for each loop is set up 312 to process each radiator in the current zone, as listed in the rad_in_zone memory array (FIG. 8F). For each row in rad_in_zone where zone_i is equal to the current zone, each radiator number is pulled out 314. The each radiator number is set to FALSE (off) in the radiator_on array (FIG. 8G). Then, the next radiator is processed 318. Finally, the function is allowed to return to the calling function 320.

Figure 15:
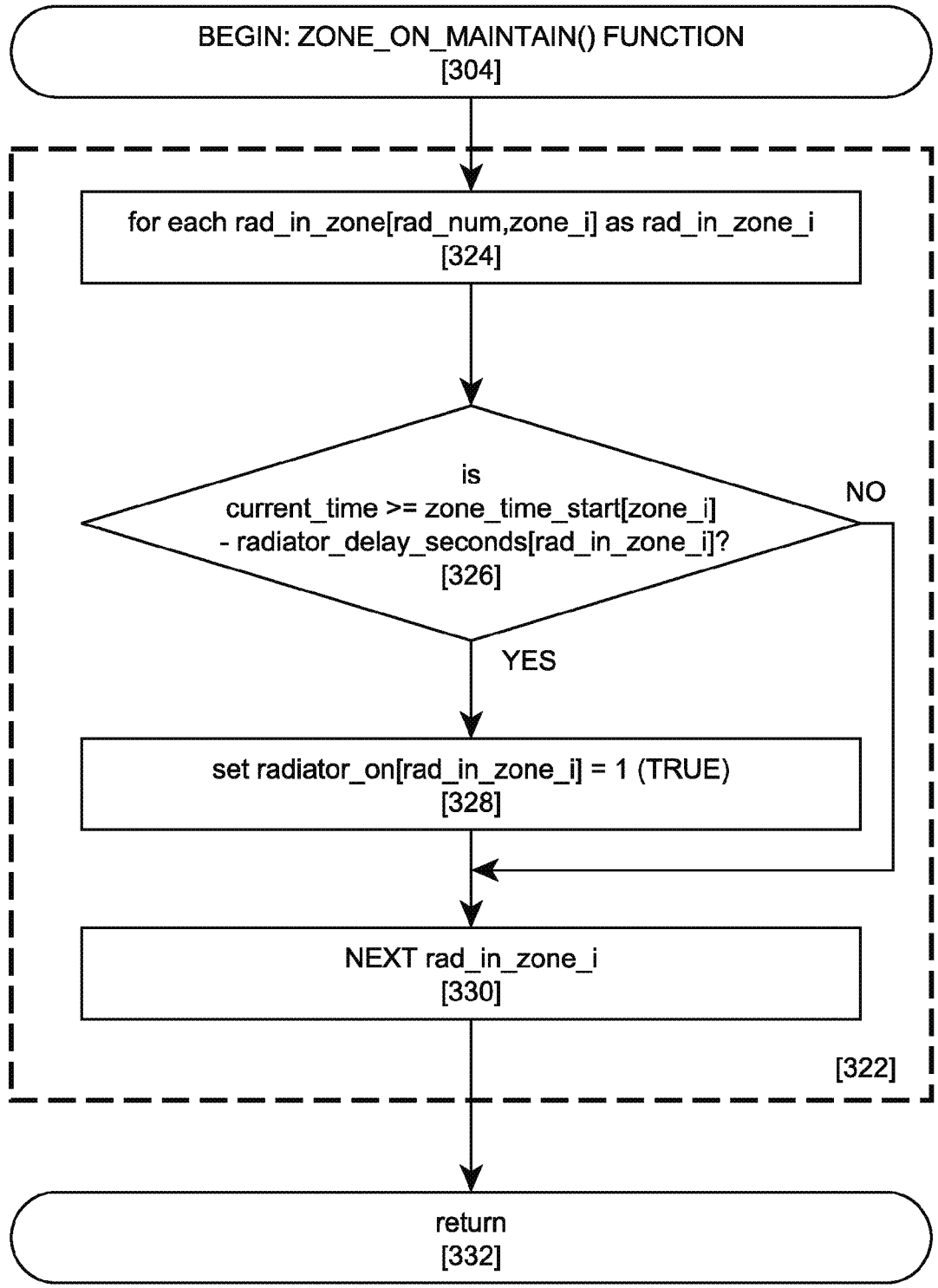
FIG. 15 is a flowchart of the function that times radiators in a specific zone so that ideal inter-zone temperature consistency is maintained, called "ZONE_ON_MAINTAIN".

FIG. 15 shows the ZONE_ON_MAINTAIN( ) function 304. This function sets whether or not each radiator should be allowed to turn on or not, in an actively turned on zone, based on the delay valves as adjusted with each heating cycle. Each radiator is processed in each "on" zone as indicated by a TRUE value in the zone_currently_on[n] data array sequentially 324 in a foreach loop 322. If the processor's current time, plus the desired delay time for each radiator as indicated in the radiator_delay_seconds[n] array (FIG. 8D) is not greater than the processor's current time 326, the next radiator is processed by incrementing the radiator_in_zone_i variable. Otherwise, if a sufficient amount of time has elapsed to satisfy the delay time 326, the radiator is set in memory that it should be turned on by setting the radiator_on[n] memory array (FIG. 8G) element for that radiator to TRUE (on) 328. The next radiator is then processed in the foreach loop by incrementing the rad_in_zone variable 330, until all elements in the rad_in_zone[n] array have been processed. Then the function returns 332.

Figure 16:
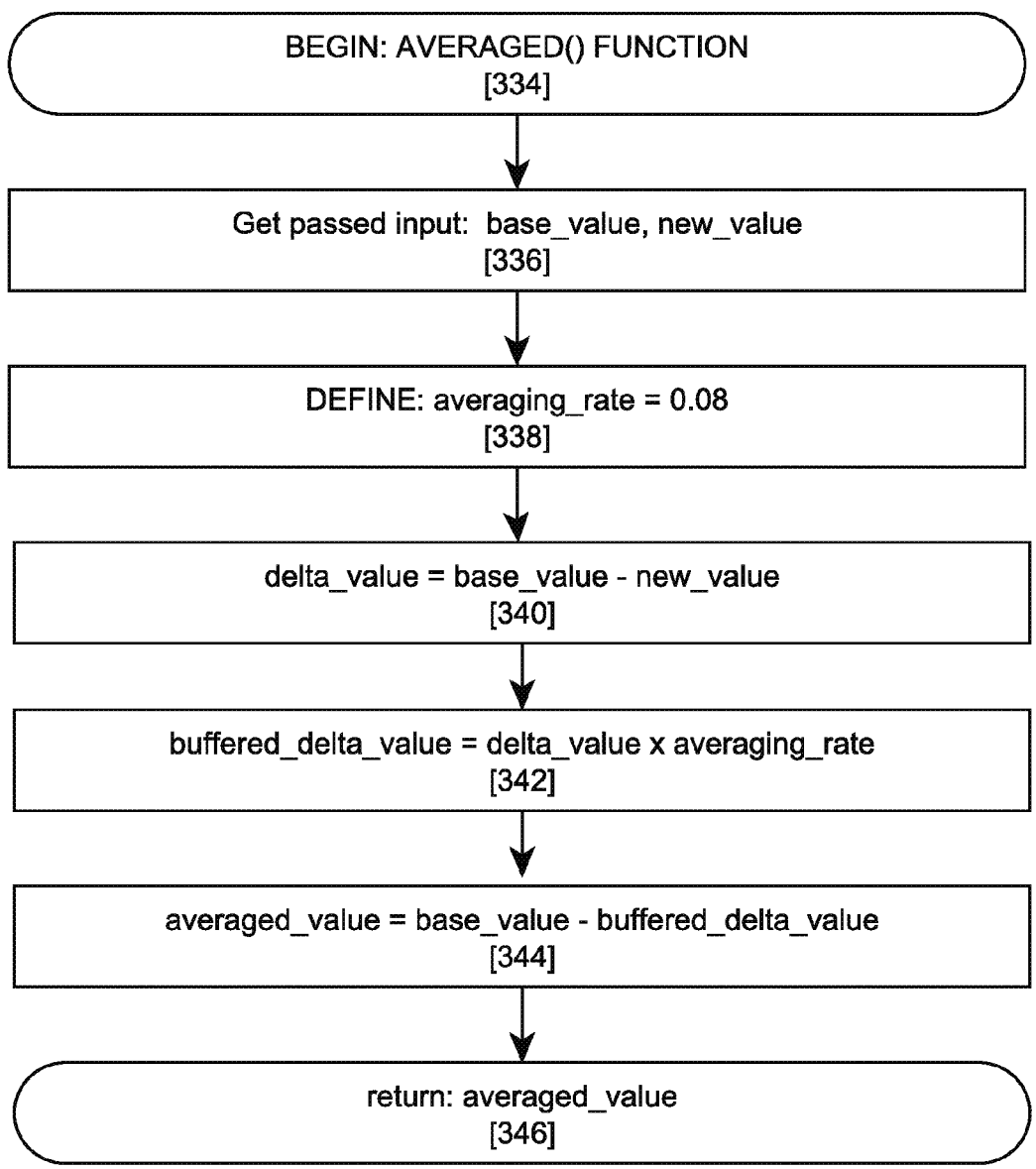
FIG. 16 is a flowchart of the function "AVERAGED" that is responsible for returning a weighted average to mitigate temperature reading error and buffer short-term temperature deviations.

FIG. 16 shows the AVERAGED( ) function 334. The function is passed two variables, a base historic value, and a raw, new value 336. An averaging weight value of 0.08 is defined 338. Then, a delta value, or difference between the base vale and the new value, is calculated 340. This calculated delta value is diluted down by multiplying it by the averaging rate value, and record it as the buffered delta value. The final averaged value is calculated by taking the base value passed and subtracting it from the buffered delta value 344, before returning this final, weighted average value to the calling function 346.

Figure 17:
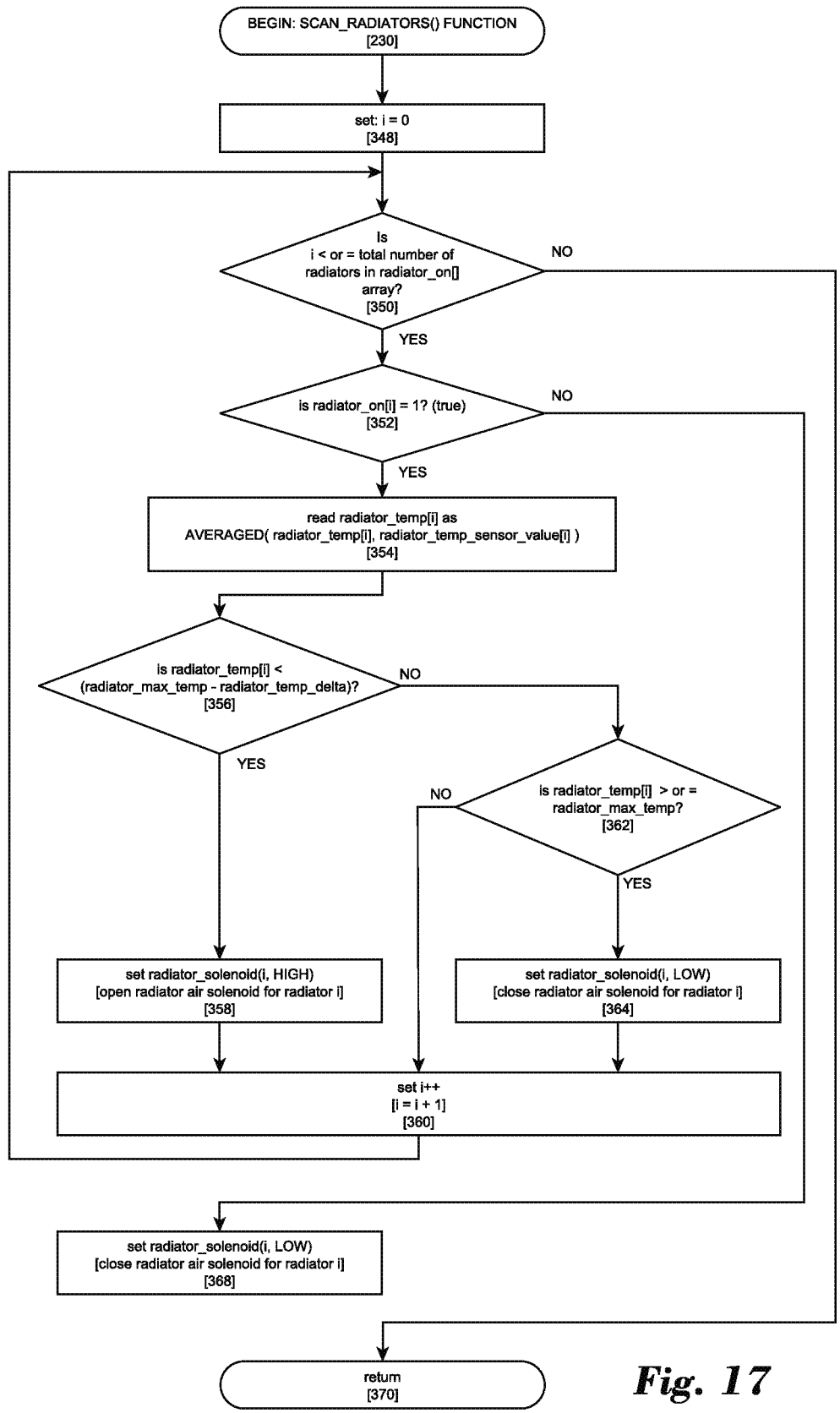
FIG. 17 is a flowchart of the function "SCAN_RADIATORS" which is responsible for ensuring that steam does not escape from radiator air vents, and the maximum heat output is obtained from each radiator when required.

FIG. 17 shows the SCAN_RADIATORS( ) function 230. This function directly controls the position of each air vent solenoid valve, processing the radiator_on[n] array (FIG. 8G) and readings of each intelligent air vent temperature probe directly. First, a temporary value of i is set to 0 348. Then, the total number of radiators is determined in the radiator_on[n] array, and compared to the current radiator being processed, represented by the temporary value of i 350. If i has reached the maximum number of radiators to be processed, then the function returns 370, otherwise the radiator_on[n] Boolean value for the current radiator i is read, and determined if it is currently set to the TRUE (on) state 352. If it is set to FALSE (off), then the memory register that is linked to the intelligent air vent interface 148 port associated with that radiator's air vent 54 is set to LOW 368, removing voltage from the air vent solenoid valve coil 76, closing the air vent. Otherwise, if the radiator_on[n] value is set to TRUE (on) 352, the current temperature of the radiator is read from the radiator_temp_sensor_value[n] and averaged at a weighted rate using the AVERARED( ) function, before updating the value stored in the radiator_temp[n] array (FIG. 8J) for that specific radiator's row 354. If the radiator_temp[n] is less than the radiator_max_temp value minus the radiator_temp_delta value 356, then the intelligent air vent interface port associated with that specific radiator's solenoid valve is set to open by setting its pin to HIGH using the radiator_solenoid(n, HIGH) function of the microprocessor 358. The next radiator is then set to be processed as variable i is incremented 360. If the radiator_temp[n] is not less than the radiator_max_temp value minus the radiator_temp_delta value 356, then the radiator_temp value is tested to see if it is greater than or equal to the radiator_max_temp value 362. If it is not, then the value of i is incremented 360, and the next radiator processed. Otherwise, if it tests true 362, then the port of the intelligent air vent for that radiator value of i is set to LOW (closed) using the radiator_solenoid(n, LOW) function 364, and the next radiator processed by incrementing i 360.

Figure 18:
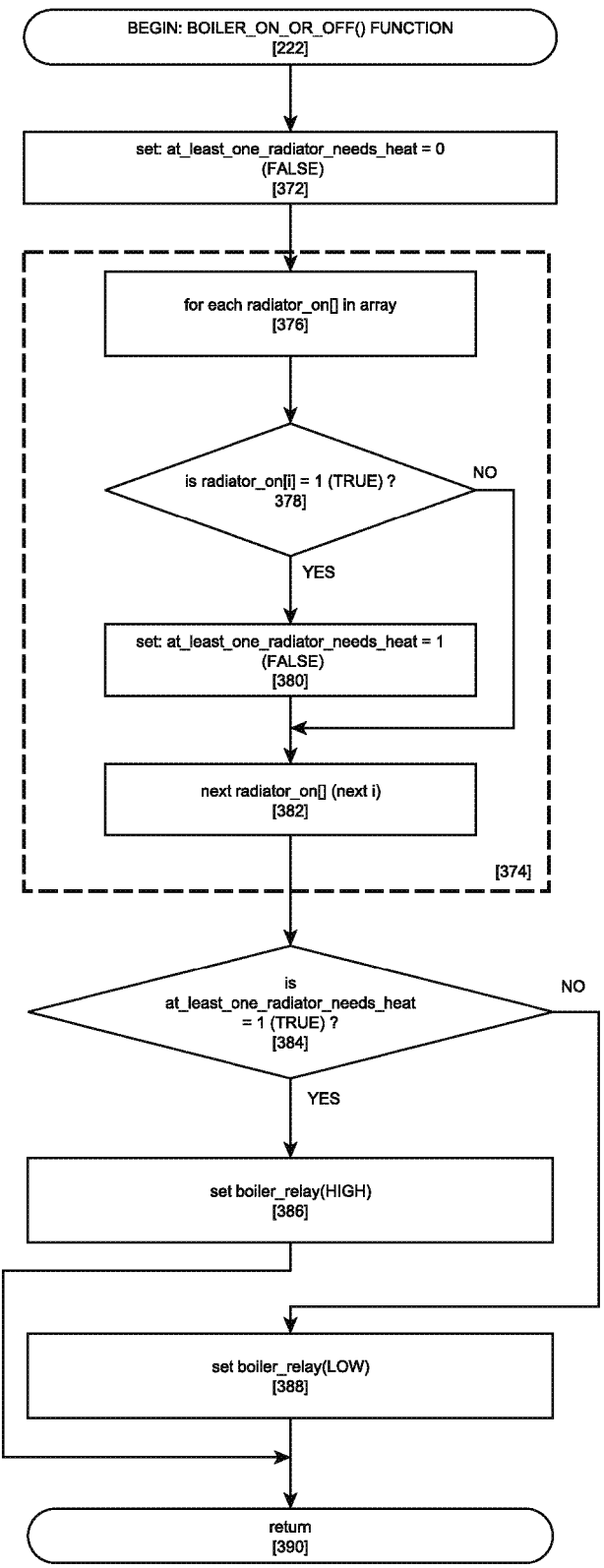
FIG. 18 is a flowchart of the function "BOILER_ON_OR_OFF" responsible for determining when the boiler should be fired through the closing of the boiler circuit relay.

FIG. 18 displays the BOILER_ON_OR_OFF( ) function 222. This function closes the relay on the boiler interface 146, completing the boiler's burner circuit, and starts the boiler 46 generating steam pressure if at least one radiator in the radiator_on[n] array (FIG. 8G) is set to TRUE (on). To test for at least one radiator being in the TRUE (on) position in the radiator_on[n] array, we first set a temporary variable at_least_one_radiator_needs_heat variable to 0 (FALSE) 372. We then create a foreach loop 374 to get the value of each element in the array 376. For each element, if it is set to TRUE (on) 378, then the at_least_one_radiator_needs_heat variable is set to 1 (TRUE) 382, before proceeding to the next radiator_on[n] element 382. If the radiator being tested is set to FALSE (off) 378, then the next radiator is processed 382, until all the elements in the radiator_on[n] array have been processed. If the variable at_least_one_radiator_needs_heat is set to 1 (TRUE) 384, then the memory address of the microprocessor that controls the output to the interface relay for the boiler 146 is set to HIGH 386, and the boiler is caused to start producing steam. Otherwise, if the variable at_least_one_radiator_needs_heat is set to 0 (FALSE), the boiler_relay interface memory address is set to LOW (off) 388. The function returns to the calling function 390.

Figure 19:
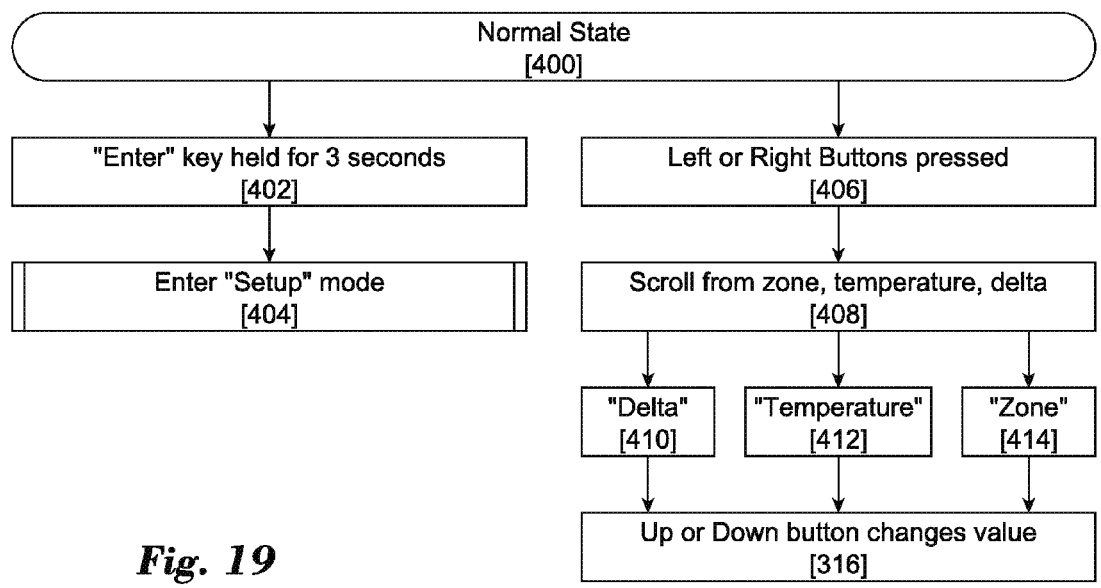
FIG. 19 is a flowchart of the menu structure of the "Normal State" user interface module menu.

FIG. 19 depicts the user menu system that can be used to control the control module 40 from the user interface module 58 (FIGS. 1, 5a and 6) or control module display 152 and keypad 154 (FIGS. 5 and 6). The "NORMAL STATE" 400 is the rest state which the system reverts to when there is no user interaction. When a user presses either the left 130 or right 132 buttons on the user interface module (FIG. 4) 406, they can scroll through normal user settings such as what zone they are viewing 414, the temperature of that zone 412, and the delta temperature 412 or spread of how far above and below the desired zone temperature will be tolerated. They can then use the up 126 and down 128 buttons on the control (FIG. 4) to change the values they are viewing 416. If the user wishes to change more administrative function of the control module, they can press and hold the "ENTER" key 134 (FIG. 5) for three seconds 402, and will enter the "SETUP" mode menu 404.

Figure 20A:
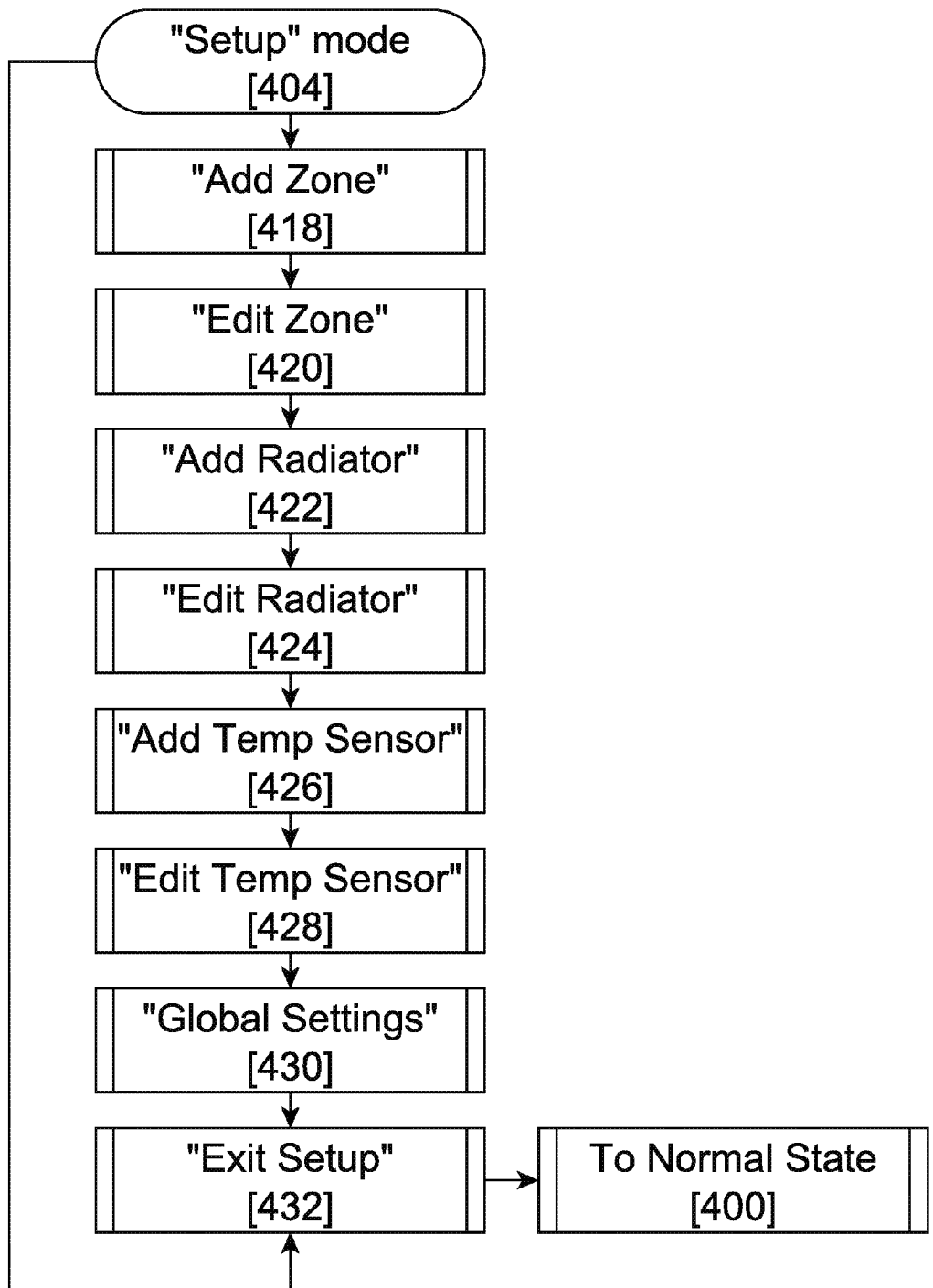
FIG. 20[A-H] are flowcharts of the menu structure of the "Setup Mode" user interface module menu. Each flowchart is described as follows:
- A. "Setup" main menu mode
- B. "Add Zone" sub-menu
- C. "Edit Zone" sub-menu
- D. "Add Radiator" sub-menu
- E. "Edit Radiator" sub-menu
- F. "Add Temp Sensor" sub-menu
- G. "Edit Temp Sensor" sub-menu
- H. "Global Settings" sub-menu

FIG. 20A shows the main functions that a user can scroll though of the SETUP mode 404. Using the up and down buttons, they can "Add Zones" 418, "Edit Zones" and their settings 420, "Add Radiators" 422, "Edit Radiators" and their settings 424, "Add Temperature Sensor Modules" 426, "Edit Temperature Sensor Modules" 428, adjust "Global Settings" 430, or "Exit Setup" mode 432 and return to the "Normal State" menu 400.

Figure 20B:
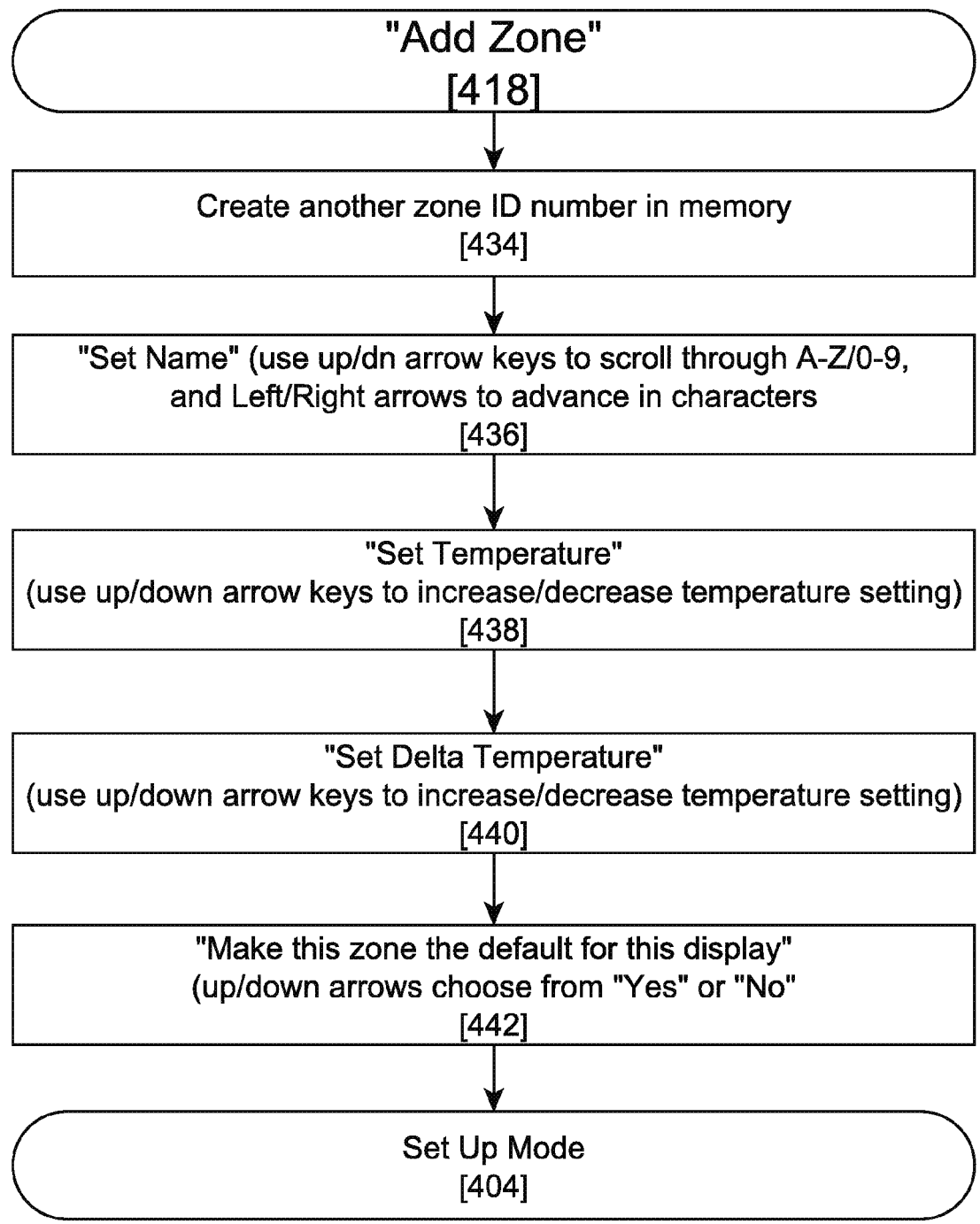
Figure 20C:
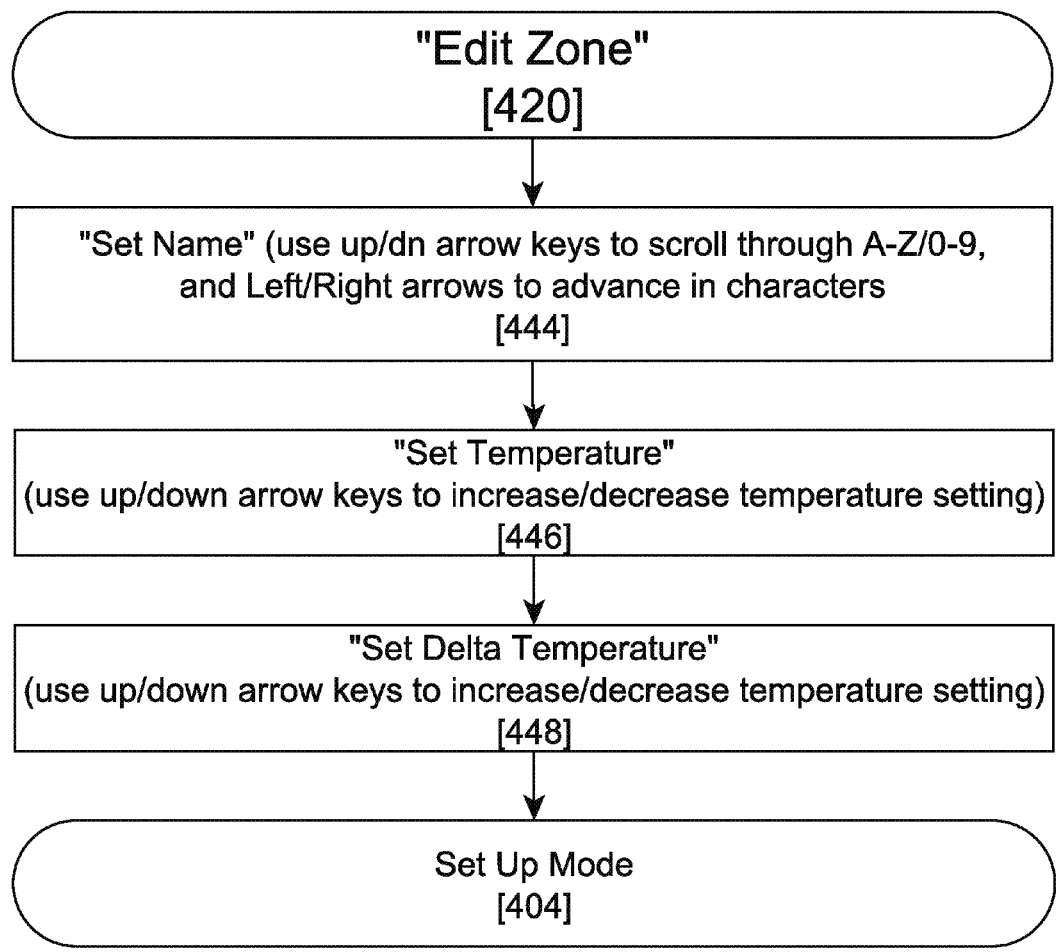
Figure 20D:
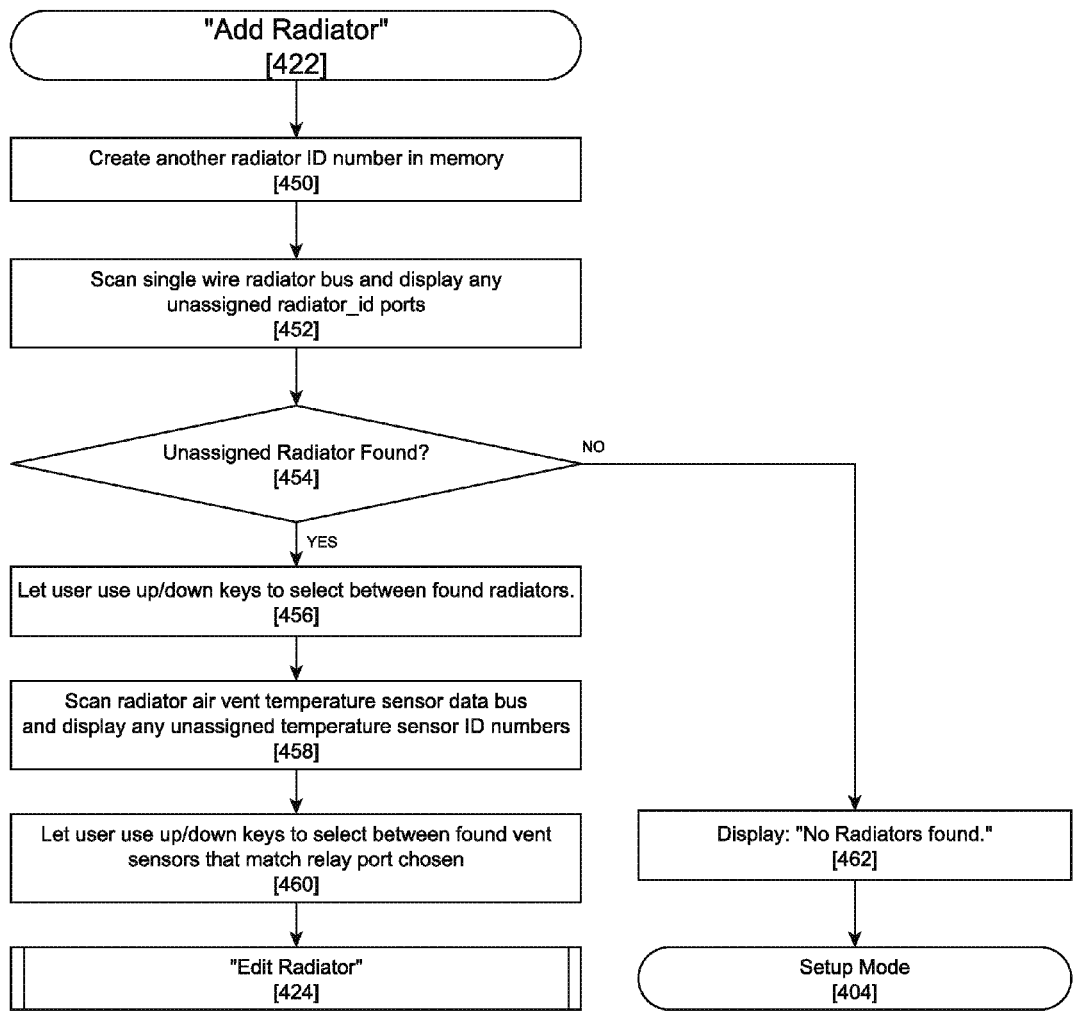
Figure 20E:
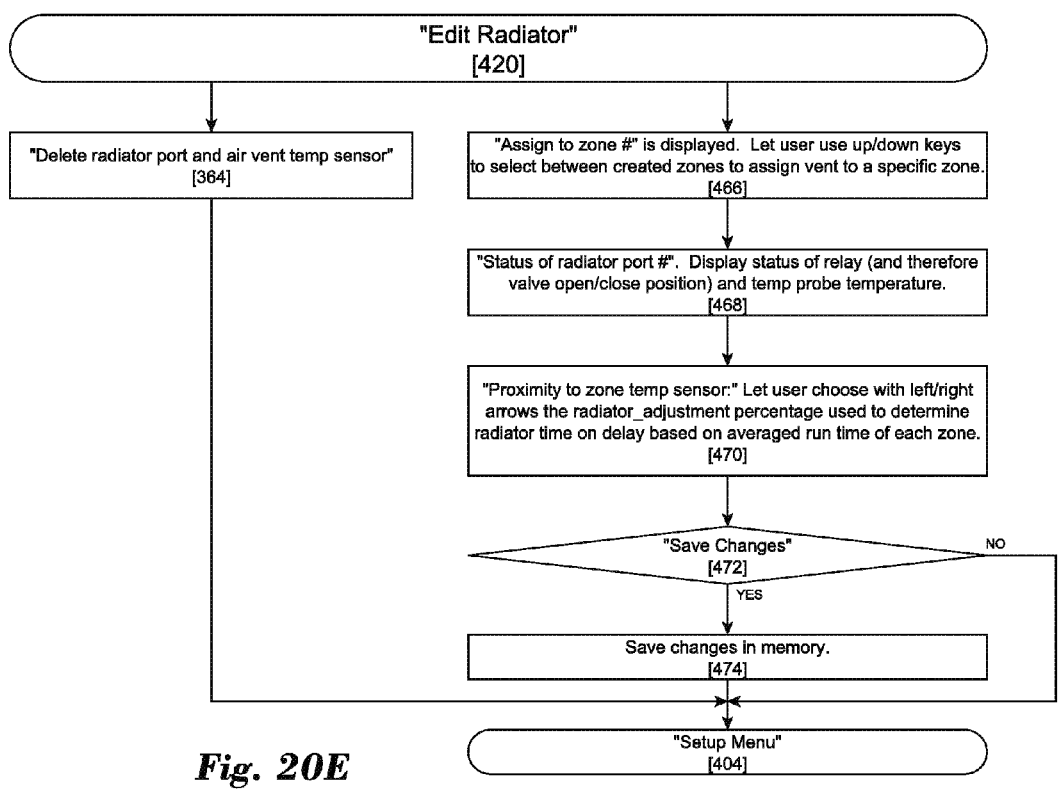
Figure 20F:
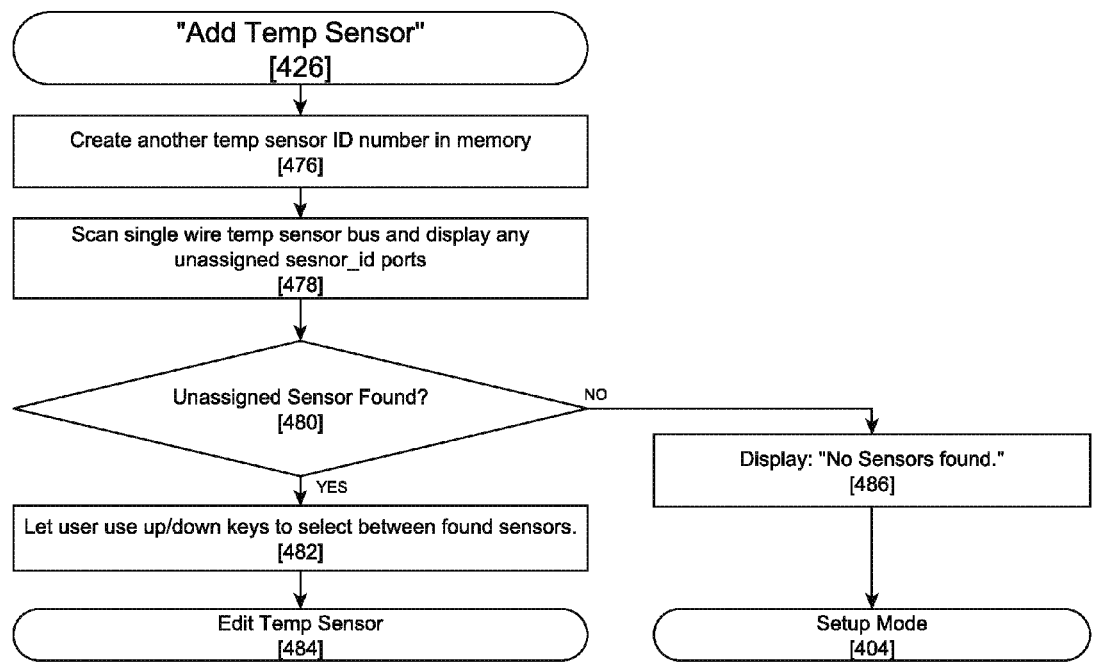
Figure 20G:
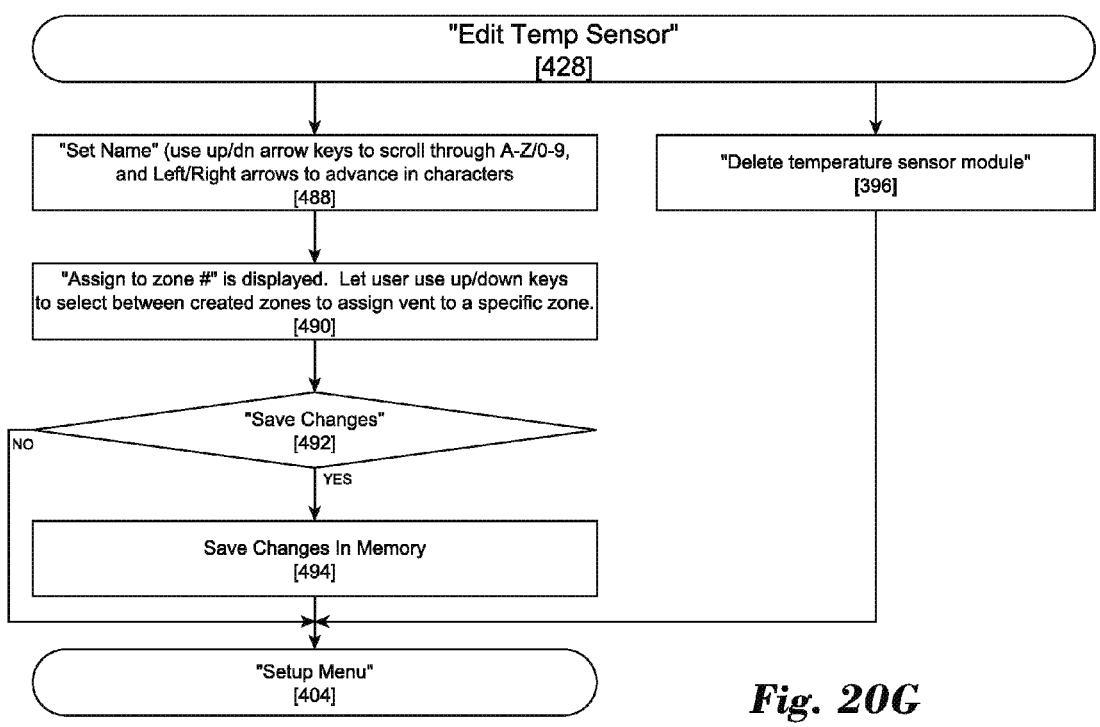
Figure 20H:
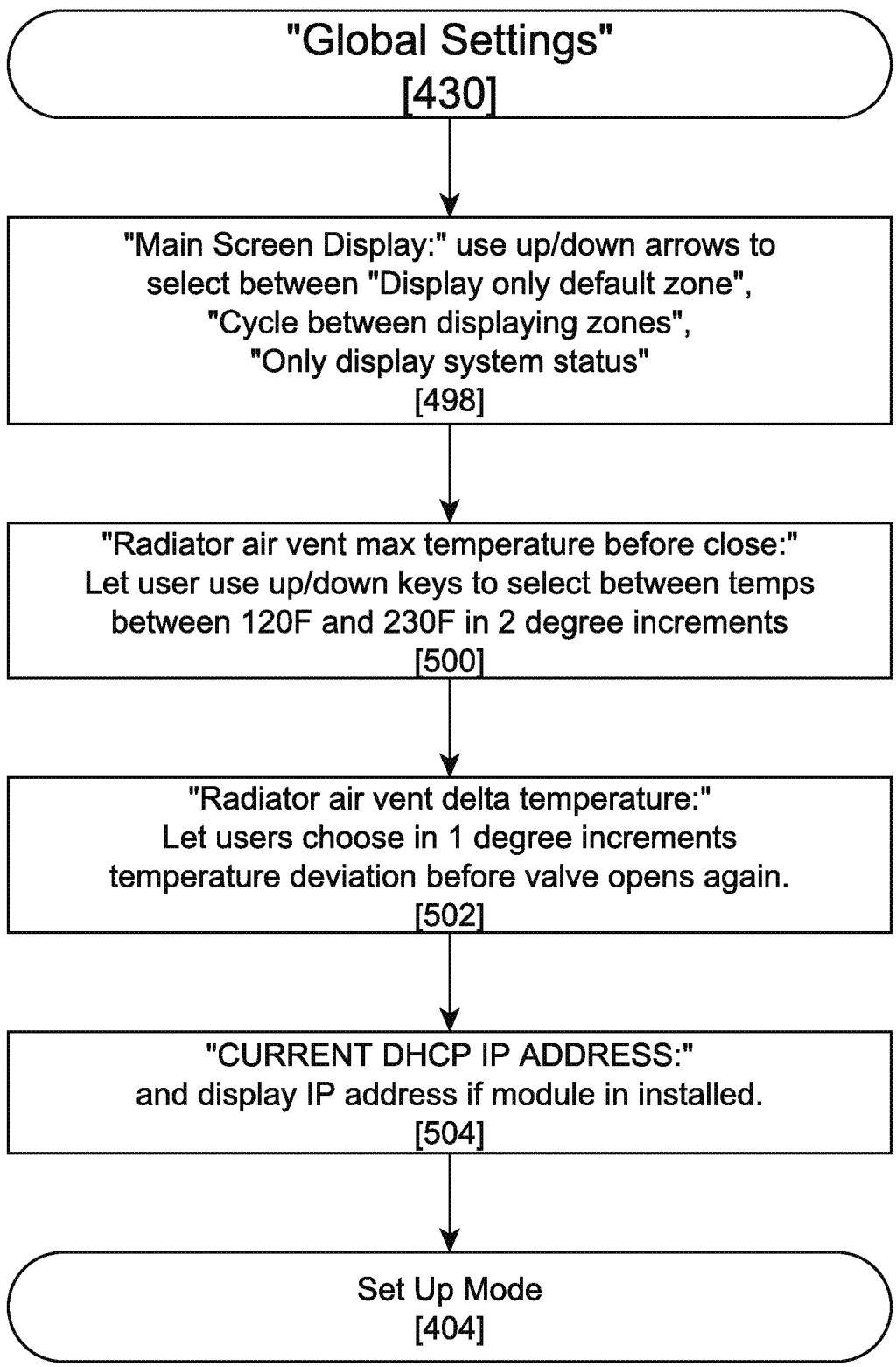

Each of these functions will be explained, starting with FIG. 20B which shows the "Add Zone" function 418. Here the user can define additional zones 434, and then set a unique name for each 436, adjust the desired temperature 438, and set the delta temperature desired 440, before being given the option of making it the "default" zone to be displayed in the "Normal State" of the system 442. FIG. 20C allows users to edit already existing zones 420, through adjusting their set names 444, adjusting their set point temperatures 446, and adjusting their delta temperatures 448, before returning to the main setup menu 404. FIG. 20D is used to create new radiators or for our scope of concern, new radiator zone valve additions to the system 422. The function allocates and finds a new radiator ID number in memory 450, followed by scanning the single wire serial bus (FIG. 7A, 176) for any unassigned radiator ID ports. If the scan does not result in any new IDs 454, then "No Radiators Found" is displayed on the user display 462, and the function returns to the main menu. If there are new IDs found 454, then the user can choose between new, unassigned radiators 456, followed by letting the user pair the respective intelligent vent temperature sensor from the list of IDs 460 as found in the sensor scan 458. The function then enters the "Edit Radiator" function 424 where the radiator can be set up more fully. FIG. 20E shows the "Edit Radiator" menu function 420, where the user can choose between deleting a radiator port and air vent temperature sensor 464 before being returned to the Setup Menu 404, or assigning a found vent port and sensor to a specific zone number 466. The user can also see the current status of the radiator valve position (open/closed) 468 and adjust the proximity to the temperature sensor module for the chosen zone 470, which will determine the delay time in opening the air vent solenoid valve after the zone calls for heat. The user can also save their changes 474. After saving changes 474, they are then returned to the setup menu 404. Temperature Sensor Modules 42 are added as shown in FIG. 20F by the "Add Temp. Sensor" menu function 426. The system creates another temperature sensor ID number in the temperature sensor array 476, and proceeds to scan the single wire temperature probe bus 170 (FIG. 7A) for any unassigned temperature sensor modules 478. If there are none found, the user display shows "No Sensors Found" 486 and is returned to the "Setup Menu" 404. If new sensors are found 480, the user can choose between one or more found, unassigned sensors 482. Thereafter, the user can be directed into the "Edit Temperature Sensor" menu function 484. The "Edit Temperature Sensor" menu function can be seen in FIG. 20G 428. It lets the user name the temperature sensor module 488, assign it to a specific zone number 490, and save their changes 492. If they choose to save their changes, the new settings are committed to memory 494; otherwise, they are discarded, and the user is returned to the main setup menu 404. The user can also choose to delete temperature sensor modules 496, before being returned to the setup menu 404.

The "Global Settings" menu 430 allows user to select the default way to display the "Normal State" screen. For instance, the main display can be set to only display the default zone settings, to scan between each zone in the system with a few seconds' pause between each one to let the user be able to read the status on the LCD display, or only display the main system status 498. The radiator air vent maximum temperature 500 and the delta temperature of each radiator air vent can be set to fine tune heat output and system efficiency. In addition, the optional network interface 156 (FIGS. 5A and 6), can be interacted with to read the current IP address of the control module on a computer network 504. Once changes are completed, the user can return the main setup mode 404.

Operation of the Preferred Embodiment

The following method and apparatus brings substantial improvement over the current methods of heat control in a steam heating system. It allows for the accurate control of individual room—and radiator—heat settings with a high degree of precision. The system is designed so that it can easily and inexpensively be installed on both new, as well as existing steam heating systems, with minimal effort. Steam systems operate on the principle of displacing air through radiator air vents with incoming hot steam from a boiler. The control of the release of this air from the radiator air vents enables the control of the extent to which each radiator is allowed to fill with steam, and therefore, the temperature each radiator is allowed to reach. Once the steam in the radiators condenses, the re-opening of the air vent controls how quickly, and often, the radiator is allowed to refill with new, hot steam. This is accomplished through the replacement of mechanical air vents on radiators with computer controlled, electromechanical air vents containing an embedded temperature sensor, referred to in this application as "intelligent air vents."

The intelligent air vents and their embedded temperature sensor are monitored and controlled via the microprocessor in the control module, interfaced through the air vent interface module circuitry. The microprocessor also monitors one or more wall mounted temperature sensor modules through a sensor data bus. The microprocessor is interfaced to a boiler relay interface, wired to the steam boiler's burner circuit, as provided by the boiler manufacturer. When the microprocessor causes this relay to close, the circuit starts the boiler producing steam. A user control interface module is connected to the sensor data bus and can interact with the microprocessor. This interface module can be used by the user to set the desired temperatures for each zone, read the temperature of a specific zone, or configure the system's parameters. The microprocessor runs a sequence of software functions that allow it to 1) open and close intelligent air vents valves, 2) measure the temperature of each air vent valve, 3) read the temperature sensor probe modules, and 4) turn on and off the steam boiler as required. This allows the control module to accurately maintain and control individual zone temperatures. The method of operation can be better defined by looking at the individual components' operation that comprise the system as a whole:

Intelligent Air Vents—The intelligent air vents have three functions: 1) To be able to turn on and off the heat of a radiator. Radiators can be kept from getting hot when the control modules does not want them to, by preventing hot steam from displacing the air in the radiator by trapping the air in the radiators, thereby keeping the steam and heat out of the radiator. Conversely, the control module can open the air vent valve, allowing air in the radiator to escape, and hot steam to fill the system when desired. 2) Though the monitoring of the temperature of the air vent valve connection, the temperature that the radiator is allowed to reach can be controlled— keeping the valve in the open position will allow additional steam to enter the radiator and the radiator to continue to rise in temperature until it has become saturated with steam, while closing the valve once the desired temperature of the radiator has been attained prevents it from becoming any hotter. 3) To prevent steam from escaping from the system into the room by closing the valve when there is a sufficient rise in temperature, signifying that the radiator is nearly filled with steam.

The attachment to the radiator is accomplished via a threaded pipe nipple or fitting, bearing a ⅛" National Pipe Thread Taper (ANSI B1.20.1), or similar threading, as used by the radiator manufacturer. The air vent is installed at the farthest distance from the steam inlet as practical on each radiator, or in place of existing mechanical air vent already in place. The air vent's electromechanical valve normally remains in the closed position, until acted upon by an electric current, at which time it opens. The spring in the valve ensures that the valve will stay in the closed position, when not energized, regardless the position it is installed in and in what direction gravity is acting upon it. Each vent incorporates a digital temperature sensor such as Dallas Semiconductor's DS1820 or Maxim Integrated's DS18S20, each providing low-speed data signaling and power for the sensor, over a single signaling wire. This sensor is located as close to the connection between the radiator and the elbow fitting as practical to allow for the accurate and timely sensing of temperature changes from escaping air, vapors, and the onset of steam passing through the elbow fitting. A wire harness connects the solenoid coil from the air vent valve and the temperature sensor to an interfacing circuit so that the microprocessor can individually open and close the solenoid valve, and identify the correct temperature valve's temperature sensor on demand. The wire harness is made from readily available control or thermostat wire containing three conductors.

Temperature Probe Modules—One or more temperature probes are installed in areas that are to have a high degree of temperature control accuracy. There can be one temperature sensor per room, one for every few rooms, one per floor, or as few as one for an entire building. At least one temperature probe must be installed per zone; however, in large zones, additional probe modules can be installed so the control module can more accurately regulate temperature. Each probe consists of a plastic housing that has vents such that ambient air in the room can freely travel through the housing and to the temperature sensor. The temperature probe module also uses a Dallas Semiconductor DS1820 or equivalent integrated circuit as its sensor. The temperature sensor is connected to two terminal screw posts, to which the probe wire harness wires can be attached. Each temperature probe module is mounted about 5 feet from the floor for accurate measurements, ideally on an interior wall of the building. The first probe is wired from the temperature probe interface terminals in the control unit to the sensor terminal screw posts. Any number of additional sensors can be connected, attaching additional probe wires from the preceding modules screw terminals to the next sensor module's screw terminals, connecting each sensor in parallel to the wire harness, and into the control module's temperature probe interface. The control module's interface circuit provides both power, to meet the requirements of the temperature sensor manufacturer, and a way the control module can read the sensors on the temperature probe bus. The temperature probe wire harness is made from two conductor thermostat or control wire to fit the particular requirements of the installation.

Boiler relay interface—Steam boiler manufacturers provide a set of terminals where a thermostat, or temperature limit, can be attached. When this circuit is completed, the boiler turns on its heat source, generating regulated steam pressure. To these terminals, a piece of two conductor thermostat wire is attached and connected to a boiler relay interface module, located inside the control module. In this way, when the relay closes, the connection between the boiler thermostat terminals is completed, and the boiler begins to produce steam pressure. The coil side of this relay is connected to interfacing circuitry so the microprocessor can activate the relay through software commands.

Microprocessor—the microprocessor uses an Arduino microprocessor consisting of a central processing unit, volatile and non-volatile memory, and a plethora of digital input/output ports. These assemblies are available from a number of different electronic component suppliers, and are programmed using open source programming environments. The microprocessor is connected to a number of interfacing circuits, such that it can communicate with and control the peripherals described in the current embodiment.

User Interface Module—the user interface described in this embodiment allows the user to set up, monitor, and adjust the temperature set points and temperature deltas for every zone. It is used to initially configure each intelligent air vent valve and embedded temperature sensor pair and assign each to a specific zone, set up and assign each temperature probe module to a specific zone, and define what each zone's temperature parameters are, as desired.

Microprocessor Software—the microprocessor software requires at least one basic recurring set of functions to operate the system correctly. For each zone, these functions read the temperature of each temperature probe module. The microprocessor then compares the reading of each zone's temperature to the desired temperature setting chosen by the user for each zone, and makes a determination whether each zone requires heat to be output. If any of the zones require heat, the boiler is turned on via the boiler interface relay, generating steam pressure in the system. If a zone does not require heat, the air vents assigned to that zone are kept closed. This prevents steam from entering into them by locking the air in the radiator, preventing it from heating up or escaping into the room. If, however, the radiators in a zone do require heat, each air vent's temperature is monitored and maintained in a target temperature range, as set in the microprocessor. This maintaining the air vent within the target temperature range continues, opening and closing the air vent valve as required, so long as the zone's temperature in which it is located has not yet been satisfied.

The microprocessor can also delay the opening of any number of radiators in a zone determined by the microprocessor to require heat. Any zone can be assigned any number of air vents. These air vents can be set in the microprocessor to delay in opening when the zone calls for heat if it is determined by the user that specific radiators are overheating areas within the zone. The microprocessor can also have more than one temperature probe module assigned to a single zone. In this case, the software allows for the microprocessor to record the time it takes for each temperature probe to reach the programmed desired room temperature. The microprocessor will, on each subsequent cycle, adjust the delay times of specific radiators marked closest to each zone sensor to optimize each heating cycle. This allows the system to automatically self-adjust the temperature of inter-zone radiators to maximize the evenness of heating in the zone.

Zones—zones are logical divisions of space within a building that could be a single room with one radiator, one room with several radiators, or several rooms with any number of radiators. Zones are defined in the software of the microprocessor. Each intelligent air vent and temperature probe module must be assigned to a specific zone. Ideally, every room that contains one or more radiators should be an independent zone. For each temperature zone, a wall mounted temperature probe module is mounted and configured in the control module, to configure this new zone. The user configuration includes setting the identification of the temperature probe module number, the zone valve interface port for the solenoid valve, the zone valve temperature sensor number, and the target temperature and delta temperature for each zone. The microprocessor then causes heat to be generated and regulated for each zone in accordance with the user defined temperature parameters such as target temperature, and temperature delta.

In summary, this method of controlling a steam heating system allows for multiple heating zones to be defined and their temperatures accurately regulated. It can be retrofit to previously installed, single zone steam heating systems, giving them the ability to have a multitude of zones, increasing efficiency, control of the system, and user comfort, and decreasing energy waste. The added ability to control individual radiator's heating cycle timing, as well as the target heating temperature range, allows additional heating capacity to be gained out of a heating system, and permits the ability to find the most energy efficient heating output temperature range.

Additional Embodiments Related to the Intelligent Air Vent

1) The purpose of the intelligent air vent's temperature sensor could also be met by employing a thermistor or similar type sensor, instead of the DS1820 sensor shown in the preferred embodiment. The DS1820 was chosen as the preferred embodiment, however, due to its high availability, inexpensiveness, and microprocessor addressability without additional circuitry.
2) Dedicated circuitry embedded into each intelligent air vent could be used to regulate each radiator's temperature, thus preventing steam from escaping when a rise in temperature of valve body is measured, and meeting a target high and low heating radiator temperature range. In this way, the valve would be caused to close through the embedded circuitry directly, instead of relying on the control module to handle this function. In this manner, the radiator's temperature and steam release prevention ability would be within a set target range whenever an electrical signal signifying the need for heat was present at the air vent's embedded circuit. The centralized point of control was chosen and is preferred over this distributed method due to the centralized method's low cost, accuracy, and ability for each radiator to be easily addressed individually and controlled to a higher degree of precision from a common central microprocessor.
3) The intelligent air vent could be configured with a mechanical air vent in conjunction with an electromechanically controlled solenoid valve. The solenoid valve would be installed between the radiator vent port and the mechanical air vent. The sole purpose of the solenoid valve would then be to allow or prevent the release of air from each radiator. This would let the mechanical, traditional air vent valve handle the prevention of steam from escaping the system into the room, and the electromechanical air vent described to control only the on or off position of each radiator. This method is not preferred due to the inability to regulate individual radiator temperature, the high failure rate of traditional mechanical air vents, and the inability to control the system with as high a degree of accuracy, however would allow for a single zone steam heating system to be given multiple temperature control zones.
4) The intelligent air vent assembly's design could incorporate an optical sensor assembly, consisting of a light emitting diode (LED) and photoreceptor, in the valve vent. This sensor assembly could be used in place of, or in addition to, the embedded temperature sensor located on the elbow fitting of the intelligent air vent. The optical sensor would monitor for the release of steam vapor through the valve outlet, directing the LED's light output across the opening of the vent valve outlet, into the photoreceptor attached on the adjacent side. Upon steam or air vapor containing sufficient water vapor escaping from the valve vent, a decrease of light transmission between the LED and the photoreceptor could be measured as a voltage drop across the photoreceptor. This drop in voltage would signal to the microprocessor that the valve should be closed. However, the monitoring of the temperature of the probe is preferred because it uses fewer parts and is seen as sufficient to accomplish the objectives sought in the preferred embodiments.
5) The intelligent air vent assembly could incorporate a wireless interface and independent power supply. In this configuration, the air vent valve could be opened and closed, as well as the temperature sensor data read, by the control module without the installation of wiring to the control module. Power for the air vent assembly would be derived from a batter power supply or wall receptacle plug-in adapter for each air vent. This embodiment necessitates a local power source, for each air vent, such as batteries that need to be periodically replaced or an adapter that consumes available receptacles in a dwelling, and is therefore not preferred.

Additional Embodiments Related to the Control Module

1) An addition to the control module would be to incorporate a "watchdog" circuit and matching software function. The circuit and function would be implemented to protect the microprocessor against locking up and not recovering, due to the possibility of software or hardware failure. Through this addition, the heating system could be safeguarded against being stuck on or off in a particular configuration if the processor were to lock up for whatever reason. This could be implemented as an inverted pulse detector attached to a relay, in line with the circuit supplying power to the microprocessor. The microprocessor would generate a periodic pulse from one of its digital outputs. This pulse would then be fed into a missing pulse detector circuit module. So long as the pulses continued at a regular rate, i.e. the digital output does not remain in a high or low state, the pulse detector will hold a relay closed, maintaining power to the microprocessor. However, if the microprocessor freezes with either the output in a high or low state, or the rate of pulses slows down too much, the output of the missing pulse detector circuit goes high, causing the logic inverter to go low, removing the power that was responsible for keeping the relay closed, opening the relay that completed the circuit supplying the microprocessor momentarily, allowing the circuit to reset and microprocessor to reset. This was not included in the preferred embodiment due to its optional nature in the functioning of the improvement described.

Additional Embodiments Related to the Control of the Control Module

1) An alternative embodiment in regard to the control of the control module would include the ability for supplementary and third party software applications to interact with, and control the control module. This would allow outside software and hardware devices to communicate with, monitor, and analyze data from the control module. This could include smart phone applications, desktop computer applications, wireless appliances such as wireless thermostats, wireless intelligent air vents, traditional thermostat systems that could be retrofit as additional inputs, or Internet-based website applications. This would allow for either an internally or externally located Web server to communicate with the control module's software and hardware. Outside applications and control could include subscription-based services such as on-line programming, data analysis, and updating of system parameters in the microprocessor.
2) This additional embodiments include the incorporation of occupancy sensor modules, such as passive infra-red (PIR) motion detectors that would communicate with the control module and the control module's software. In this manner, temperatures in occupied rooms could be triggered to have increased target temperature set points, over the temperatures of unoccupied rooms or rooms that have no motion detected by the PIR sensors, allowing for the reduction of heating energy waste. This was not included in the preferred embodiment due to its supplementary nature in regard to the workings of the innovation.

The embodiments to which an exclusive property or privilege is claimed are defined as follows:

1. A steam heating system comprising:
    a) a microprocessor;
    b) a program for the microprocessor to execute;
    c) a steam boiler;
    d) a piping system attached to the steam boiler;
    e) one or more steam radiators attached to the piping system coming from the steam boiler, such that steam is directed from the boiler into the one or more radiators;
    f) an air vent port on each steam radiator, through which air and vapors from inside the one or more radiators and the piping system can be displaced by incoming steam, allowing the steam to enter into the one or more radiators;
    g) an electromechanical air vent valve, attached to each of the respective air vent ports, that can communicate with the microprocessor, such that each of the respective vent valves can be individually and discretely opened and closed by the microprocessor;
    h) a vent valve temperature sensor located on each of the respective air vent valves, in thermal contact with a respective valve body, that allows the temperature of escaping air and vapors from the valve to be read by the microprocessor;
    i) a boiler interfacing circuit, connected between the microprocessor and the steam boiler, that allows the microprocessor to start or stop the production of steam pressure by completing the boiler interfacing circuit; and
    j) a room temperature sensor probe, the sensor probe configured to be associated with one or more rooms in a house or building, as defined in the program that the microprocessor executes as at least one zone, to allow the microprocessor to read and associate the probe temperature readings as the ambient air temperature of the respective zone,
a system of controls through which the program executed on the microprocessor can:
    a) read each of the respective temperature sensor probes;
    b) start or stop the steam boiler's production of steam pressure; and
    c) open or close each of the respective electromechanical air vent valves on an individual and discrete basis for each of the one or more radiators;
whereby the program compares heating zone temperature set point variables defined in the program with the respective room temperature sensor probe readings in the respective zone, such that when the program identifies the respective zone is deficient in heat from defined temperature parameters, causes the steam boiler to produce steam pressure, while opening the respective radiator air vent valves assigned to the deficient zone, so long as the respective valves are within defined radiator temperature set point parameters as indicated by each vent valve's temperature sensor, thereby allowing steam pressure, when present, to displace air from the respective radiator vent port and fill the radiators that have open air vent valves with steam, while preventing radiators with closed air vent valves from allowing steam to enter, reading the respective vent valve temperature sensors, until the program's parameters are satisfied respective to the program defined zone associated with the respective collection of radiators, air vents, and temperature sensors, closing the respective vent valves as heat is no longer indicated by the microprocessor, until all of the program defined zones, are no longer deficient in heat, at which time the program controls the electrical circuit to the steam boiler to stop producing steam.

2. A method of steam heating, comprising the steps of:
    a) providing the steam heating system of claim 1; that allows the configuration of program operating parameters and program variables, including:
    b) addition, deletion, and editing of the at least one zone;
    c) association of the respective room temperature sensor probe with a respective one of the zones;
    d) association of each of the radiator vent valves with a respective one of the zones;
    e) association of each of respective radiator vent valve temperature sensors with a respective one of the zones;
    f) setting of target high and low operating temperatures for each of the one or more respective radiators;
    g) setting of target zone temperatures desired for a respective zone; and
    h) providing a software interface for controlling the program executed by the microprocessor.

3. The method in accordance with claim 2 where user interaction can occur with the microprocessor through the use of a hardware interface, comprising:
    a) a user display;
    b) a keypad a user can use for input and selection of data; and
    c) an interface controller that allows communication with the microprocessor,
        such that a user can interact with the microprocessor.

4. A method of steam heating, comprising the steps of:
a) providing the steam heating system of claim 1; through which temperatures of each of the one or more radiators are controlled, comprising the steps of:
b) reading the respective air vent valve temperature sensors by the microprocessor;
c) having the microprocessor compare the respective vent valve temperature sensor reading to a target maximum temperature as configured in the program;
d) having the microprocessor close the respective air vent valve if the microprocessor determines that the vent valve temperature reading has exceeded the target maximum temperatures;
e) having the microprocessor compare the respective vent valve temperature sensor reading to a target minimum temperature as configured in the program; and
f) having the microprocessor open the respective air vent valve if the microprocessor determines that the vent valve temperature reading is below the target minimum temperature.

5. The method in accordance with claim 4, further comprising:
f) reading the temperature of each of the respective air vent valve temperature sensors by the microprocessor;
g) closing the respective air vent valve if the air vent valve temperature sensor's reading exceeds a program defined maximum temperature setting; and
h) opening the respective air vent valve if the temperature sensor reading falls below the program defined maximum temperature setting;
wherein said method prevents steam from escaping from each of the respective radiator air vent valves by detecting onset of steam travelling through each of the respective vent valves.

6. A method of steam heating comprising the steps of:
providing the steam heating system of claim 1 where more than one of the room temperature sensor probes is used to increase the accuracy of one of the respective zone temperature parameters.

7. The method in accordance with claim 6, further comprising the steps of:
a) associating more than one of the temperature sensor probes with a specific one of the zones;
b) defining for the respective air vent valves a percentage of effect the respective attached radiator has on each of the temperature sensors in the respective zone;
c) having the microprocessor record with an average time previous heating cycles for each of the zones have taken;
d) having each respective air vent valve be delayed from opening at a start of a zone's heating cycle of the respective zone by the difference of the time the previous heating cycle lasted minus the quantity of the percentage of effect of how long the previous heating cycle took; and
e) having the averaged time that each zone's heating cycle previously took updated with each zone's heating cycle.

8. A method of steam heating, comprising the steps of:
a) providing the steam heating system of claim 1 and timing the opening of each of the respective air vent valves within each of the respective zones requiring heat;
b) reading a program defined delay variable for each of the one or more respective radiators within the respective zone; and
c) delaying the opening of the air vent valves by the defined delay for the one or more respective radiators,
d) providing a control for adjusting a start of each radiator heating cycle from the time the respective zone is determined to require heat, whereby a heating output of each of the one or more respective radiators within the respective zone can be adjusted while utilizing a single temperature set point for each of the respective zones.

9. A method of steam heating, comprising the steps of:
providing the steam heating system of claim 1 that allows each of the air vent valves to have set in the program a delay time in seconds, such that when the respective zone the air vent valve is assigned to requires heat, each respective air vent valve's delay time will prevent the respective valve from opening until this time has elapsed from a start of a zone's heating cycle of the respective zone.

10. A method of steam heating, comprising the steps of:
providing the steam heating system of claim 1;
a communications ability among the microprocessor, and the respective air vent valves, the respective air vent valve temperature sensors, the respective room temperature sensor probes, and one or more user interfaces, such that the one or more user interfaces can communicate and interact with the microprocessor, through the use of electrical wiring.

11. A method of steam heating, comprising the steps of:
providing the steam heating system of claim 1;
a communications method comprising the ability to control the microprocessor through at least one wireless control device, where each of the respective air vent valves, the respective air vent valve temperature sensors, the respective room temperature sensor probes, and a user interface can communicate and interact with the microprocessor through the use of a wireless radio communication.

12. A method of steam heating, comprising the steps of:
a) providing the steam heating system of claim 1;
b) providing an interface where devices and applications are allowed to interact with the microprocessor through wired and wireless network interfaces, including:
1) an internet web server with a front end user interface to control the microprocessor;
2) an external networked thermostat interface;
3) a network adapter that converts one interface protocol to another;
4) a smart phone application;
5) a table computer application; and
6) a desktop computer application,
c) providing a means of reading, writing, and controlling the microprocessor and altering the program executed by the microprocessor; whereby all aspects of the microprocessor's settings, operating parameters, and sensor data read can be read and manipulated.

13. A method of steam heating, comprising the steps of:
providing the steam heating system of claim 1;
providing the ability for a user to input temperatures into the interface that consists of:
a) a median target temperature; and
b) a delta temperature,
providing a set of parameters through which halving a value of the delta temperature and adding the median temperature will define a high limit temperature setting, and halving a value of the delta temperature and subtracting the median temperature will define a low limit of a temperature setting.

* * * * *